United States Patent
Pont

(10) Patent No.: US 9,830,211 B2
(45) Date of Patent: Nov. 28, 2017

(54) FRAMEWORK AS WELL AS METHOD FOR DEVELOPING TIME-TRIGGERED COMPUTER SYSTEMS WITH MULTIPLE SYSTEM MODES

(71) Applicant: Safetty Systems Ltd, Great Darby (GB)

(72) Inventor: Michael Joseph Pont, Great Dalby (GB)

(73) Assignee: Safetty Systems LTD, Great Darby (GB)

( * ) Notice: Subject to any disclaimer, the term of this patent is extended or adjusted under 35 U.S.C. 154(b) by 0 days.

(21) Appl. No.: 15/035,050

(22) PCT Filed: Mar. 16, 2015

(86) PCT No.: PCT/GB2015/000090
§ 371 (c)(1),
(2) Date: May 6, 2016

(87) PCT Pub. No.: WO2015/173532
PCT Pub. Date: Nov. 19, 2015

(65) Prior Publication Data
US 2017/0083394 A1    Mar. 23, 2017

(30) Foreign Application Priority Data

May 11, 2014 (GB) .................................. 1408285.3
May 11, 2014 (GB) .................................. 1408286.1

(51) Int. Cl.
*G06F 11/07*   (2006.01)
*G06F 9/48*    (2006.01)
*G06F 11/30*   (2006.01)

(52) U.S. Cl.
CPC ........ *G06F 11/0757* (2013.01); *G06F 9/4887* (2013.01); *G06F 11/0703* (2013.01);
(Continued)

(58) Field of Classification Search
CPC . G06F 11/0757; G06F 11/0721; G06F 9/4887
See application file for complete search history.

(56) References Cited

U.S. PATENT DOCUMENTS 5,226,152 A    7/1993  Klug et al.
5,388,261 A *  2/1995  Anderson ............. G06F 9/4881
                                                         715/201
(Continued)

FOREIGN PATENT DOCUMENTS

EP    0987629      3/2000
EP    2672341      12/2013
(Continued)

OTHER PUBLICATIONS

Lucas et al., *Operating Mode Specific WCET Analysis*, Proceedings of JRWRTC, pp. 15-18, Oct. 2009.
(Continued)

*Primary Examiner* — Yolanda L Wilson
(74) *Attorney, Agent, or Firm* — DASCENZO Intellectual Property Law, P.C.

(57) ABSTRACT

The invention relates to a time-triggered computer system 800 that involves [i] a Processor (801) that has been designed to run in one of two or more pre-determined system modes, in each of which it will execute one or more tasks according to a predetermined task schedule; and [ii] a System-Mode Data Store (802) that contains information about the next system mode that the system is required to operate in; and [iii] a Processor Reset Mechanism (803) that will reset the Processor when it is necessary to change the system mode; and [iv] a Processor Configuration Mechanism (804) that is designed to configure the Processor in accordance with the required system mode after a Processor reset, using information stored in the System-Mode Data Store, and [v] a Task-Timing Data Store (805), that contains information about the Task WCET Limit and/or Task BCET
(Continued)

Limit for one or more tasks that are executed by the Processor, and [vi] a Task-Execution-Time Monitoring Mechanism (806) that is designed to monitor the execution time of tasks that are executed by the Processor and take corrective action, by means of the Processor Reset Mechanism (803) and the Processor Configuration Mechanism 804, if the task breaches its pre-determined Task WCET Limit or Task BCET Limit.

25 Claims, 11 Drawing Sheets

(52) U.S. Cl.
CPC ...... *G06F 11/0721* (2013.01); *G06F 11/0733* (2013.01); *G06F 11/30* (2013.01)

(56) References Cited

U.S. PATENT DOCUMENTS

| | | | |
|---|---|---|---|
| 5,655,083 A * | 8/1997 | Bagley | G06F 11/0709 714/23 |
| 6,085,218 A | 7/2000 | Carmon | |
| 6,182,238 B1 * | 1/2001 | Cooper | G06F 9/4843 710/266 |
| 6,526,527 B1 * | 2/2003 | Gall | G05B 19/0428 714/51 |
| 6,560,726 B1 * | 5/2003 | Vrhel, Jr. | G06F 11/0757 713/2 |
| 8,375,258 B1 * | 2/2013 | Sheets | G06F 11/0721 714/55 |
| 9,164,796 B2 * | 10/2015 | Andrianiaina | G05B 19/0426 |
| 2002/0007387 A1 | 1/2002 | Ginsberg | |
| 2002/0184482 A1 * | 12/2002 | Lacombe | G06F 11/0757 713/1 |
| 2003/0079163 A1 * | 4/2003 | Hashimoto | G06F 11/0721 714/55 |
| 2005/0015767 A1 | 1/2005 | Nash et al. | |
| 2005/0138465 A1 * | 6/2005 | Depew | G06F 11/1044 714/5.11 |
| 2007/0168731 A1 | 7/2007 | Lambrache et al. | |
| 2007/0220375 A1 * | 9/2007 | Baz | G06F 11/0715 714/55 |
| 2008/0263507 A1 | 10/2008 | Chang et al. | |
| 2010/0281298 A1 | 11/2010 | Pont et al. | |
| 2010/0306598 A1 * | 12/2010 | Ackaret | G06F 11/073 714/47.1 |
| 2010/0306602 A1 * | 12/2010 | Kamiya | G06F 11/0757 714/56 |
| 2011/0107310 A1 * | 5/2011 | Pont | G06F 11/3644 717/129 |
| 2011/0154107 A1 * | 6/2011 | Alexander | G06F 9/30145 714/10 |
| 2011/0292056 A1 | 12/2011 | Haas et al. | |

FOREIGN PATENT DOCUMENTS

| | | | | |
|---|---|---|---|---|
| GB | WO 2007028942 A1 * | 3/2007 | | G06F 9/4825 |
| WO | WO 2007/028942 | 3/2007 | | |
| WO | WO 2009/113034 | 9/2009 | | |

OTHER PUBLICATIONS

Hughes et al., *Reducing the impact of task overruns in resource-constrained embedded systems in which a time-triggered software architecture is employed*, Transactions of the Institute of Measurement and Control, 30, 5, pp. 427-450, 2008.
Pont, *Embedded C*, Addison-Wesley, 2002.
Pont, *Patterns for Time-Triggered Embedded Systems: Building reliable applications with the 8051 family of microcontrollers*, ACM Press Books, 2002.
Pont et al., *Using watchdog timers to improve the reliability of single-processor embedded systems: Seven new patterns and a case study*, VikingPLoP, 2002.
Leung et al., *A Note on Preemptive Scheduling of Periodic, Real-Time Tasks*, Information Processing Letters, vol. 11, No. 3, Nov. 18, 1980.
Gendy et al., *Towards a Generic "Single-Path Programming" Solution with Reduced Power Consumption*, Proceedings of the ASME 2007 International Design Engineering Technical Conferences & Computers and Information in Engineering Conference (IDETC/CIE), DETC 2007-35375, Las Vegas, Nevada, Sep. 4-7, 2007.
Pont et al., *Meeting real-time constraints using "Sandwich Delays,"* EuroPLoP 2006.
Kinner et al., *Discussion of Misconceptions about WCET Analysis*, WCET, pp. 61-64. 2003.
Puschner, *Is Worst-Case Execution-Time Analysis a Non-Problem?—Towards New Software and Hardware Architectures*, Proc. 2nd Euromicro International Workshop on WCET Analysis—United Kingdom, Department of Computer Science, University of York, 2002.
Puschner et al., *Writing Temporally Predictable Code*, Proceedings of the Seventh International Workshop on Object-Oriented Real-Time Dependable Systems, (WORDS 2002), IEEE, pp. 85-91, 2002.
Oh et al., *Control Flow Checking by Software Signatures*, Center for Reliable Computing, Technical Report, CRC-TR 00-4, Apr. 2000.

* cited by examiner

FRAMEWORK AS WELL AS METHOD FOR DEVELOPING TIME-TRIGGERED COMPUTER SYSTEMS WITH MULTIPLE SYSTEM MODES

FIELD OF THE INVENTION

The present invention relates to an apparatus and a method which provides improved reliability and security for computer systems. In particular, the present invention relates to a framework for developing time-triggered computer systems with multiple system modes, and a method of providing such a framework.

BACKGROUND TO THE INVENTION

A computer system is usually comprised of one or more "Commercial Off The Shelf" (COTS) processors—for example, microcontrollers or microprocessors—and some software that will execute on such processor(s): this software may be created, for example, using a programming language such as 'C' or Ada.

In many cases, processors are "embedded" inside larger systems, including cars, aircraft, industrial and agricultural machinery, medical equipment, white and brown goods and even in toys. It is estimated that people in the developed world encounter around 300 of such "embedded systems" every day while going about their normal activities.

Other related uses of computer systems include real-time "desktop" applications, such as air-traffic control and traffic management.

When creating such computer systems, developers must choose an appropriate system architecture. One such architecture is a "time-triggered" (TT) architecture. Implementation of a TT architecture will typically involve use of a single interrupt that is linked to the periodic overflow of a timer. This interrupt may drive a task scheduler (a simple form of "operating system"). The scheduler will—in turn—begin the execution of the system tasks (a process sometimes called "releasing" the tasks, "triggering" the tasks or "running" the tasks) at predetermined points in time. The tasks themselves are typically named blocks of program code that perform a particular activity (for example, a task may check to see if a switch has been pressed): tasks are often implemented as functions in programming languages such as 'C'.

This type of TT design can offer very predictable system behaviour, making it comparatively easy to test and verify the correct operation of real-time computer systems that are based on such an architecture: this is one reason why TT designs are often used in safety-critical systems, high-integrity systems and in other products where system reliability and/or security are important design considerations.

While it is possible to create a working system with a single task, most TT designs involve multiple tasks. More generally, there may be several different sets of tasks, with each set of tasks matched to a particular system mode. For example, most systems will have at least a "Normal" task schedule and a different (sometimes very simple) "Error" or "Fail Silent" schedule for use when unrecoverable errors have been detected. More commonly, there may be several different "normal" system modes, each with different task schedules: for example, a passenger car may have different task schedules for use when manoeuvring at low speeds and for motorway driving.

Traditional approaches to changing system modes in TT designs involve mechanisms for adding/removing tasks from the schedule. For example, the TT task scheduler described in Reference 1 is widely used: it provides SCH_Add_Task( ) and SCH_Delete_Task( ) functions that can be called at any time while the scheduler is running. Such mechanisms for changing system modes have the benefit of simplicity, and can work effectively: however, they also open up opportunities for introducing a number of very significant reliability and security problems.

It will be appreciated that TT schedules are—by their very nature—static in nature, and a key strength of this development approach is that a complete task schedule can be carefully reviewed at design time, in order to confirm that all system requirements have been met. In general, it is extremely difficult to change the system mode in such designs using conventional methods without undermining this static design process. When tasks can be added or removed from the schedule at "random" times (perhaps—for example—in response to external system events), then the system design becomes dynamic (it is no longer "time triggered"), and it is not generally possible to predict the precise impact that the mode change will have on all tasks in the schedule.

It will be appreciated that—even where the perturbations to the behaviour of a TT system during traditional mode changes are short lived—this may still have significant consequences. TT designs are often chosen for use in systems where security is an important consideration. In such designs—because the task schedule is known explicitly in advance—it is possible to detect even very small changes in behaviour that may result from security breaches (for example, if the system code has been changed as the result of a virus, etc). In circumstances where dynamic changes to a task set are permitted (as in traditional mode changes), this may mask security-related issues.

Traditional approaches to mode changing in TT system may also have a negative impact on the processes of error detection and error handling in such designs. One important class of errors relates to execution time. In particular, it is important that each task completes its activities within a pre-determined "worst case execution time" (WCET). When a task exceeds its predicted WCET (a situation that is sometimes referred to as a "task overrun"), this can have a highly detrimental impact on the behaviour and reliability of the whole system, because it breaches assumptions that were made when the system was developed. In some systems, a task overrun may result in fatal consequences for the system users or those in the vicinity of the system. Thus, it is important that task overruns are detected quickly and handled effectively.

It will also be appreciated that where a task completes more quickly than its predicted "Best Case Execution Time" (BCET)—a situation sometimes referred to as a task underrun—this may also be symptomatic of problems with the system.

One common way of detecting and handling task overruns (and, sometimes, task underruns) is through the use of watchdog timers (WDTs): see, for example, Reference 2. It will be appreciated that—when used in this way—the appropriate WDT settings will vary with the task set. It is inevitable, therefore, that—if tasks are added or removed dynamically from the task set as part of a mode-change operation—it may then be appropriate to change the WDT settings. Unfortunately, it may not be possible to make such changes, since most modern microcontrollers are deliberately designed in such a way that alterations to the WDT settings can only be made immediately after a system reset. The intention with such a design feature is to reduce the likelihood that the WDT settings will be corrupted during the system operation: were such corruption to take place, this might mean that the WDT was disabled altogether, or triggered to run at the wrong time. In either event, the consequences could be severe, and preventing inadvertent or malicious changes to the WDT setting during normal operation makes very good sense in many system designs.

Where it is not possible to change the WDT settings during the programme run, settings must be chosen that will work with all task combinations, both in all system modes and during the transition between system modes. The inevitable consequence is that the resulting settings will be sub-optimal for some or all system modes. The end result is likely to be that a long timeout period must be employed: this will mean that the WDT mechanism can respond only comparatively slowly when an error occurs. This slow response may have very serious consequences in many systems, and it further undermines one of the key advantages that can be obtained from a TT design (that is, very predictable timing behaviour and—consequently—the potential for a very rapid response if the behaviour is not as expected).

A number of techniques have been proposed previously as a means of addressing problems related to those presented here.

For example, a form of WDT has been proposed that allows changes to the configuration during the program run (see Reference 3). This solution requires specialised hardware (that is, it cannot be applied with most COTS processor platforms). Where such specialised hardware is available, there is the possibility that the WDT settings will be corrupted during the system operation (which is why such changes are prohibited in most WDT implementations, as discussed earlier in this document).

As another potential solution to some of the problems raised earlier in this document, software-based "task guardian" mechanisms have been proposed (see Reference 4). Such task guardian mechanisms may provide a way of dealing with task overruns very quickly. However, such software mechanisms can substantially increase the amount of code required to implement the system. This in turn can increase system costs and complicate both the development and maintenance process for the system. In addition, the use of software task guardians still involves the replacement of one task with another while the scheduler is running: this type of dynamic solution may—for the reasons outlined above—cause a number of problems in TT system designs.

Other task-guardian mechanisms, typically involving modified computer hardware plus additional software have also been proposed as ways of detecting and handling task overruns in embedded computer systems (see, for example, Reference 5 and Reference 6). Such approaches can be effective, but require specialised hardware that will not be available in the majority of systems. In addition, this approach may—again—involve replacement of one task with another while the scheduler is running, with the consequences discussed previously.

Overall, there is a widespread need to be able to support controlled and predictable mode changes—both under normal conditions and in the event of errors—when developing embedded systems with a TT architecture. The traditional process of changing modes in such designs opens up a number of potential reliability and security loopholes.

It is therefore an objective of embodiments of the present invention to improve the reliability and security of time-triggered computer systems by providing a framework that provides a comprehensive solution to the problem of mode changing, both under normal circumstances and when errors—including task timing errors—are detected.

SUMMARY OF THE INVENTION

According to a first aspect of the present invention, there is provided a time-triggered computer system comprising:
- a Processor adapted to operate in one of two or more pre-determined system modes, in each of which it will execute one or more tasks according to a predetermined task schedule; and
- a System-Mode Data Store adapted to store information about the next system mode that the system is required to operate in; and
- a Processor Reset Mechanism adapted to reset the Processor when it is necessary to change the system mode; and
- a Processor Configuration Mechanism adapted to configure the Processor in accordance with the required system mode after a reset, using information stored in the System-Mode Data Store; and
- a Task-Timing Data Store adapted to store information comprising the Task WCET Limit and/or Task BCET Limit for one or more tasks that are executed by the Processor; and
- a Task-Execution-Time Monitoring Mechanism adapted to monitor the execution time of one or more tasks that are executed by the Processor and take corrective action, by means of the Processor Reset Mechanism and the Processor Configuration Mechanism, if the task breaches its Task WCET Limit or Task BCET Limit.

In accordance with this aspect of the invention, a computer system is provided that executes scheduled tasks with increased security and a reduced likelihood of a critical failure.

The computer system is arranged to execute sets of tasks in accordance with two or more predetermined system modes. The task schedules for each task set determine the order in which tasks are executed and specify whether or not specific tasks are allowed to interrupt other tasks. The tasks are executed under control of the Processor.

During normal operation, the computer system may need to change the system mode. For example, an industrial robot may employee three different (normal) modes when painting an automotive component. The system may also need to change mode if an error is detected: for example, in the event of a task-timing error, the above industrial robot may be required to enter a "fail silent" mode, to reduce the chances of harm to factory staff.

Unlike conventional systems, in accordance with this aspect of the invention, planned changes between the current system mode and the next system mode comprise storing information about the next system mode (in the System-Mode Data Store) and then using the Processor Reset Mechanism to reset the processor: after such a reset, the Processor Configuration Mechanism may be used to retrieve information about the required system mode (from the System-Mode Data Store) and set up the processor as required for this particular system mode.

Also in accordance with this aspect of the invention (and again unlike conventional systems), the computer system incorporates a Task-Execution-Time Monitoring Mechanism (TETMM). The TETMM uses information about the Task WCET Limit and/or the pre-determined Task BCET Limit for one or more tasks in the system to detect task overruns and/or underruns while the system is operating. If any such overruns or underruns are detected, the system is able to take corrective action—by means of the Processor Reset Mechanism and the Processor Configuration Mechanism—to handle this error. For example, if an overrun is detected in Task X, the system may be reset and configured to start again in a different mode in which Task X is replaced with a backup task (with similar functionality but a different implementation), with the intention that the system can continue to function effectively, with a reduced risk that the task overrun will occur again.

It will be appreciated that, unlike conventional computer systems, in accordance with this aspect of the invention, the computer system comprises a means of changing between system modes that is integrated with a means of detecting and handling timing-related errors.

It will also be appreciated that, unlike conventional computer systems, in accordance with this aspect of the invention, change of system modes by means of a processor reset ensures that the transition is made between one complete set of tasks (that can be subject to detailed analysis, test and verification at design time) and another complete set of tasks (that can be similarly assessed at design time).

It will be further appreciated that the majority of modern COTS processors allow changes to WDT settings (only) at the time of a processor reset. Unlike conventional systems, in accordance with this aspect of the invention, the processor is reset whenever the system mode is changed, making it possible to use optimal WDT settings with each system mode.

The Processor may comprise one or more "soft" or "hard" processor cores (that execute some software) and/or one or more hardware cores (that do not execute any software).

The Processor may comprise one or more processor chips, such as a commercial-off-the-shelf (COTS) microcontroller or microprocessor, Digital Signal Processor (DSP), Field-Programmable Gate Array (FPGA), Application Specific Integrated Circuit (ASIC) or similar device.

Preferably, the Processor comprises a time-triggered scheduler.

Optionally, the Processor will comprise a time triggered cooperative (TTC) scheduler or a time triggered hybrid (TTH) scheduler, similar to the designs described in detail in Reference 1.

Optionally, the System-Mode Data Store will comprise one or more non-volatile memory devices, such as battery-backed Random Access Memory (RAM), Flash memory or Electrically-Erasable Programmable Read-Only Memory (EEPROM).

Optionally, any or all information held in the System-Mode Data Store will be copied two or more times across one or more physical data storage devices.

Preferably, the Processor Reset Mechanism will comprise a "watchdog timer" mechanism that is refreshed (or "fed") regularly under normal circumstances, but which is not refreshed—and therefore causes the Processor to be reset—when an error occurs, or when there is some other reason to change the system mode.

Preferably, the Processor Configuration Mechanism will comprise software routines or other mechanisms that are executed after the Processor is reset and before the Processor begins to execute any tasks, such software routines or other mechanisms being used to configure the system in accordance with one of the two or more pre-determined system modes.

Preferably, the Processor Configuration Mechanism will comprise software routines or other mechanisms for reading from the System-Mode Data Store in order to determine which predetermined system mode the system should be configured in.

Preferably, the Task-Timing Data Store will comprise one or more non-volatile memory devices, such as battery-backed Random Access Memory (RAM), Flash memory or Electrically-Erasable Programmable Read-Only Memory (EEPROM).

Optionally, any or all information held in the Task-Timing Data Store will be copied two or more times across one or more physical data storage devices.

Preferably, the Task-Timing Data Store will comprise predetermined Task WCET Limit and Task BCET Limit for all tasks that are to be executed by the Processor, this information being determined and stored before the computer system begins to operate.

Alternatively, the Processor may create at least one Task WCET Limit and/or Task BCET Limit, and store it in the Task-Timing Data Store, during the system operation. Such a Task WCET Limit and/or Task BCET Limit may be created by recording the task execution times from the Processor at points during the system operation.

Optionally, Task WCET Limit and/or Task BCET Limit information will be stored in the Task-Timing Data Store for only a subset of the tasks that are executed by the Processor.

Preferably, the Task-Execution-Time Monitoring Mechanism will comprise a timer that is initialised and configured to generate an interrupt (that is, the Task WCET Limit Interrupt) at a time greater than the Task WCET Limit. This timer may be started when the task is released and stopped when the task completes, if the task completes before the Task WCET Limit Interrupt is triggered.

Preferably, the Task WCET Limit Interrupt will be linked to an Interrupt Service Routine which stores information about the task that has exceeded its Task WCET Limit in the System-Mode Data Store and then forces the Processor to reset itself, by means of the Processor Reset Mechanism.

Preferably, when a task completes its execution without triggering the Task WCET Limit Interrupt, the Processor will call a software routine or other mechanism (that is, the Minimum Timing Check Routine). The Minimum Timing Check Routine will then use timing information obtained from the Task-Execution-Time Monitoring Mechanism to determine whether the task concerned has completed its execution in a time less than its Task BCET Limit: if so, the Task Minimum Timing Check Routine may store information about the task that has completed its execution in a time less than its Task BCET Limit in the System-Mode Data Store and use the Processor Reset Mechanism to force a change in system mode, in order to handle this task-timing error.

Optionally, the Task-Execution-Time Monitoring Mechanism will be used to monitor the execution time of multiple tasks at the same time, in TT designs that support task pre-emption.

According to a second aspect of the present invention, there is provided a method of controlling a time-triggered computer system that has been adapted to operate in one of two or more system modes, in each of which it will execute one or more tasks according to a predetermined task schedule, the method comprising the steps of:

configuring the computer system in accordance with an appropriate system mode after any system reset, making use of any relevant system-mode data that was stored by the system prior to the reset to inform the configuration process;

performing a planned mode-change reset of the computer system when it is necessary to change the system mode during normal operation, after storing any available system-mode data;

monitoring the execution time of some or all of the tasks executed by the computer system;

performing a planned timing reset of the computer system when a monitored task breaches a pre-determined worst-case execution time limit for the task concerned, after storing any available system-mode data.

performing a planned error reset of the computer system when an error is detected that is not related to a monitored task breaching a timing limit, after storing any available system-mode data.

In accordance with this second aspect of the invention, the method for configuring the computer system in accordance with an appropriate system mode after any system reset, making use of any relevant system-mode data that was stored by the system prior to the reset to inform the configuration process, may comprise the steps of: determining whether the system reset was a planned mode-change reset, a planned timing reset, a planned error reset or was the result of some other reset event; configuring the computer system in a predetermined system mode, if the cause of the reset was the result some other reset event; configuring the computer system in the required system mode, if the cause of the reset was a mode-change reset; configuring the computer system in accordance with an appropriate system mode after any system reset, making use of any relevant system-mode data that was stored by the system prior to the reset to inform the configuration process, with a backup task employed in place of the task that demonstrated a timing error, if such a backup task is available, if the cause of the reset was a planned timing reset; configuring the computer system in a fail-silent mode or similar mode, if the cause of the reset was a planned error reset; configuring the computer system in fail-silent mode or similar mode if the cause of the reset was a planned mode-change reset or a planned timing reset and this type of error has occurred previously in a manner that suggests that the system may be entering into a repeated cycle of behaviour involving detection of an error followed by a reset, followed by detection of the same error, followed by reset, and so on.

In accordance with this second aspect of the invention, a method for monitoring the execution time of some or all of the tasks executed by the computer system may comprise use of a free-running hardware timer.

According to a third aspect of the present invention, there is provided a computer program product containing one or more sequences of machine-readable instructions, the instructions being adapted to cause one or more processors to provide a computer system according to the first aspect.

According to a fourth aspect of the present invention, there is provided a computer program product containing one or more sequences of machine-readable instructions, the instructions being adapted to cause one or more processors to perform a processing method according to the second aspect.

BRIEF DESCRIPTION OF THE FIGURES

The present invention will now be described by way of example only and with reference to the accompanying figures in which.

DETAILED DESCRIPTION OF THE INVENTION

We begin by describing some existing techniques that are employed to create computer systems that execute tasks according to a predetermined task schedule. We then go on to describe how the present invention can be used to improve the reliability and security of such computer systems.

Computer systems that execute tasks according to a predetermined task schedule are sometimes referred to as time-triggered (TT) systems. TT systems are typically (but not necessarily) implemented using a design based on a single interrupt linked to the periodic overflow of a timer.

Figure 1:
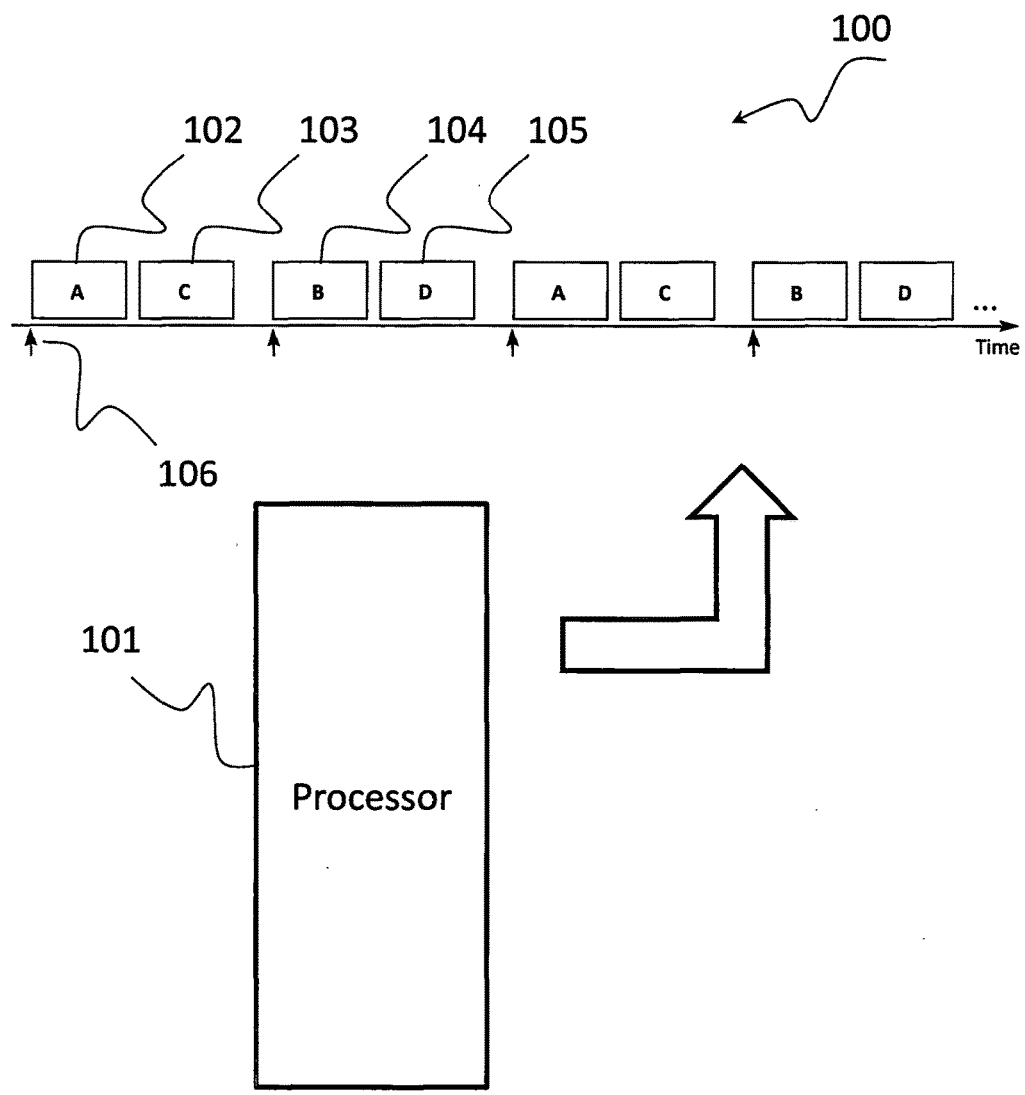
FIG. 1 illustrates in schematic form a sequence of task executions in a form that might be generated (for example) by a time-triggered co-operative (TTC) scheduler running on a Processor.

For example, FIG. 1 shows a TT computer system 100 made up of a Processor 101 that is executing a set of software tasks (in this case Task A 102, Task B 103, Task C 104 and Task D 105) according to a predetermined task schedule. In FIG. 1, the release of each sub-group of tasks (for example, Task A 102 and Task B 103) is triggered by what is usually called a "Timer Tick" 106. The Timer Tick is usually implemented by means of a timer interrupt.

In FIG. 1, the Timer Ticks are periodic. In an aerospace application, the "Tick Interval" (that is, the time interval between Timer Ticks) of 25 ms might be used, but shorter Tick Intervals (e.g. 1 ms or less) are also used in many systems.

In FIG. 1, the task sequence executed by the computer system is as follows: Task A, Task C, Task B, Task D.

In many designs, such a task sequence will be determined at design time (to meet the system requirements) and will be repeated "forever" when the system runs (until an error occurs, or the system is halted or powered down).

Sometimes it is helpful (for example, during the design process) to think of this task sequence as a "Tick List": such a list lays out which task will execute in each system "Tick", and the order in which these executions will occur.

For example, the Tick List corresponding to the task set shown in FIG. 1 could be represented as follows:
[Tick 0]
Task A
Task C
[Tick 1]
Task B
Task D Once the system reaches the end of the Tick List, it starts again at the beginning.

Figure 2:
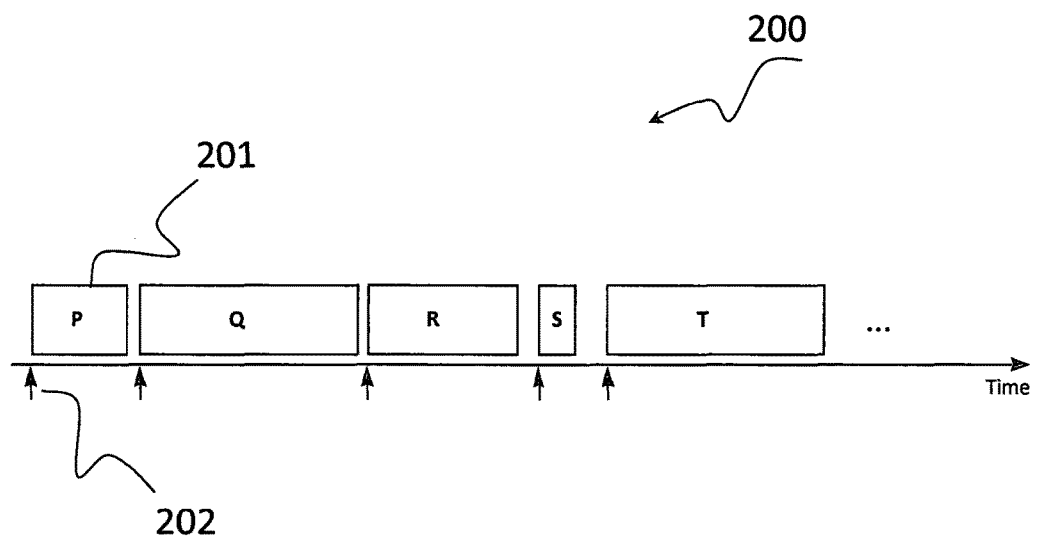
FIG. 2 illustrates in schematic form an alternative sequence of task executions in a form that might be generated (for example) by a TTC scheduler running on a Processor in which the system ticks are not periodic.

It should be made clear that the Timer Ticks need not be periodic in such systems. For example, FIG. 2 shows a schematic representation 200 of a task set (including Task P 201) in which the Timer Ticks have been adapted to match the execution times of the various tasks. Such systems can also be represented by a Tick List: for example, a possible Tick List corresponding to the task set shown in FIG. 2 might be as follows:
[Tick 0, t=0 ms]
Task P
[Tick 1, t=3 ms]
Task Q
[Tick 2, t=11 ms]
Task R
[Tick 3, t=17 ms]
Task S
[Tick 4, t=19 ms]
Task T
. . . .

In FIG. 1 and FIG. 2, the tasks are co-operative (or "non-preemptive") in nature: each task must complete before another task can execute. The design shown in these figures can be described as "time triggered co-operative" (TTC) in nature.

Note that implementation of TTC designs need not involve the use of interrupts at all. For example, we could execute the set of tasks shown in FIG. 1 (102, 103, 104, 105) as follows:

Task A
Task C
[Delay]
Task B
Task D
[Delay]

Again, the above sequence would repeat "forever". This type of solution is sometimes called a "Super Loop". In general, control of the task timing is less precise in Super Loop systems than for those involving interrupts, but—for TTC designs with what is sometimes called "soft" timing constraints—use of a Super Loop may be appropriate.

Figure 3:
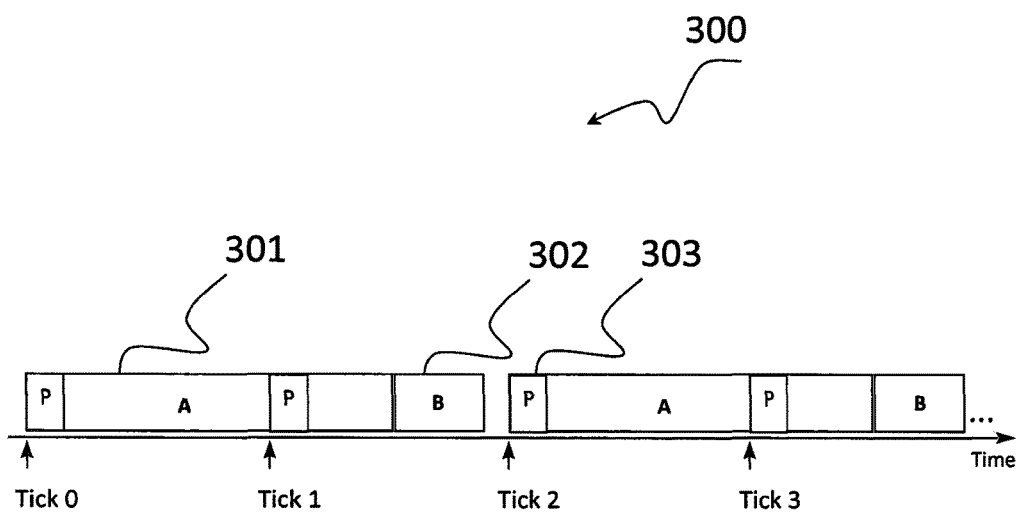
FIG. 3 illustrates in schematic form a sequence of task executions in a form that might be generated (for example) by a time-triggered hybrid (TTH) scheduler running on a Processor.

Other popular TT designs involve the use of task pre-emption, where a high-priority task can interrupt (pre-empt) a lower-priority task while it (that is, the lower-priority task) is running. For example, FIG. 3 shows a set of three tasks 300, Task A 301 (a low-priority, co-operative task), Task B 302 (another low-priority, co-operative task), and Task P 303 (a higher-priority pre-empting task). In this example, the lower-priority tasks 301 302 may be pre-empted periodically by the higher-priority task 303. More generally, this kind of "time triggered hybrid" (TTH) design may involve multiple co-operative tasks (all with an equal priority) and one or more pre-empting tasks (of higher priority).

Implementation of TTH designs will generally involve the use of interrupts.

The task sequence for the task set 300 in FIG. 3 could be listed as follows: Task P, Task A, Task P, Task B, Task P, Task A, Task P, Task B.

For any set of periodic tasks, the cycle of task executions will always repeat, after an interval known as the hyperperiod (or "major cycle"). The length of the hyperperiod can be determined by calculating the "lowest common multiple" (LCM) of the periods of all tasks in the set.

For example, suppose that we have a set of two tasks, with periods of 4 ms and 5 ms.

The multiples of 4 are: 4, 8, 12, 15, 20, 24 . . . .
The multiples of 5 are: 5, 10, 15, 20, 25 . . . .
The lowest common multiple (and the length of the hyperperiod) is 20 ms.

Where a set of periodic tasks is asynchronous, there is a delay (or offset) before one or more tasks runs for the first time. This is the case—for example—in the task set shown 100 in FIG. 1. In this case, Task A 102 and Task B 103 run with an offset of 0, but Task C 104 and Task D 105 both run after a delay of 1 Tick. Note that all four tasks have the same period (2 Ticks) in this example.

When a set of asynchronous periodic tasks runs, there may be an initial period during which the task sequence is not the same as the task sequence when the system is in a "steady state". We refer to this initial period as the Task Sequence Initialisation Period.

Reference 7 demonstrates that—if required—the length of this Task Sequence Initialisation Period can be calculated by: (longest task offset)+2*(length of hyperperiod).

For example, for the following set of tasks:
Task_A: Period=5 ms, Offset=0 ms
Task_B: Period=10 ms, Offset=1 ms
Task_C: Period=25 ms, Offset=2 ms
Task_D: Period=25 ms, Offset=3 ms
Task E: Period=50 ms, Offset=4 ms The length of the hyperperiod is 50 ms.
The length of the Task Sequence Initialisation Period is 104 ms.

Where a set of periodic tasks is synchronous, all tasks execute for the first time in the first Tick.

Figure 4:
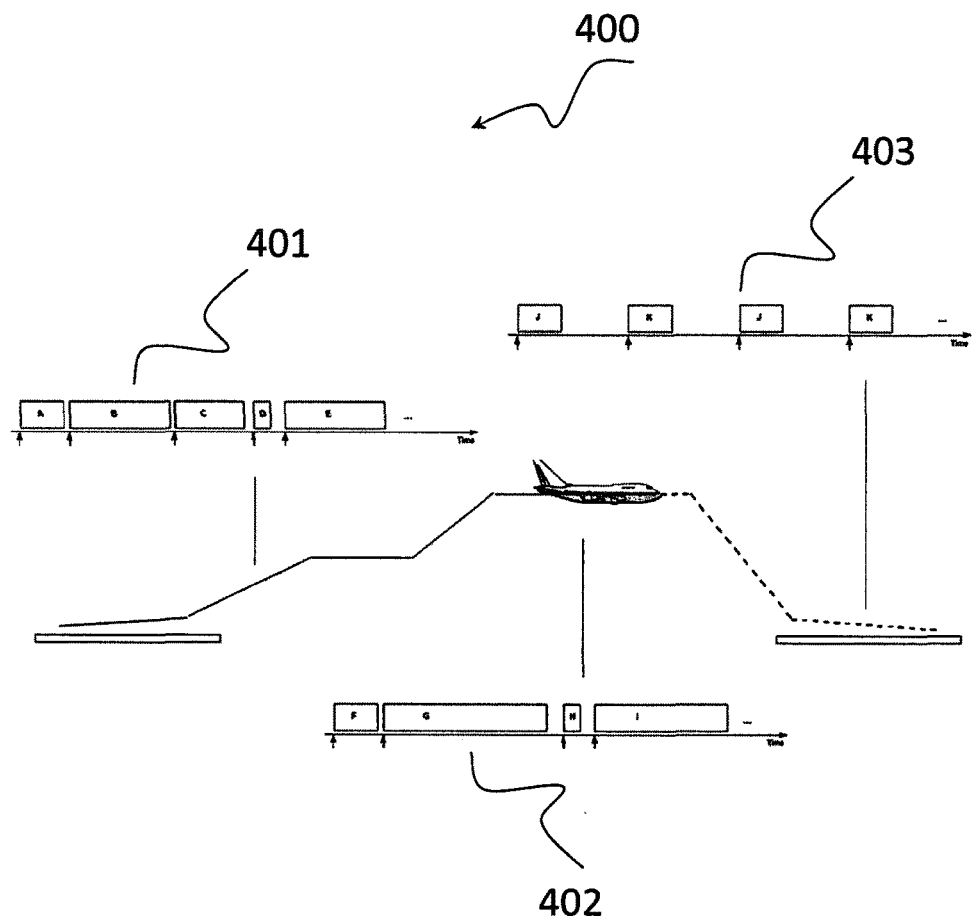
FIG. 4 illustrates in schematic form the operation of a system in which the Processor executes different sets of tasks in different system modes.

Both TTC and TTH designs (as well as other TT designs) may employ several task schedules, for use in different system modes. For example, FIG. 4 shows a schematic representation of the software architecture 400 for an aircraft system with different system modes (401, 402, 403) corresponding to the different flight stages (preparing for takeoff, climbing to cruising height, etc).

It will be appreciated that it is important to be clear about the precise meaning of a change in system mode. In the present invention, we say that there is a change in the system mode if the task set is changed.

As a non-limiting example, we note that many TT are developed using periodic tasks. Suppose that we have such a set of tasks—Task Set X—as follows:
Task Set X={A (10 ms), B (15 ms), C (5 ms)}

In this case, we are representing each task with a task name (e.g. "A"), and with a period (e.g. 10 ms). Note that other parameters—e.g. execution time, offset, jitter, and so on—may be included in a more complete representation of a task set, but this representation will meet our requirements in this example.

In the context of the present invention, changing the task set means either:

(i) to change the tasks in the set, or (ii) to keep the list of tasks the same, but change the parameters of one or more of the tasks.

Thus, in the example below, all of the Task Set X, Task Set Y and Task Set Z are all different.
Task Set X={A (10 ms), B (15 ms), C (5 ms)}
Task Set Y={A (10 ms), B (15 ms), C (7 ms)}
Task Set Z={D (10 ms), B (15 ms), C (5 ms)}

It will be appreciated that, when developing TT designs with multiple system modes, we are likely to have a different Tick List for each system mode.

Note that—during the system design—we may need to consider the Task Sequence Initialisation Period both when the system is initialised, and at any time at which the system mode changes.

Note also that—for such a TT system design—we can determine at design time precisely what the task sequence will be when the system operates: this means that—if required—we can determine the task sequence even during the Task Sequence Initialisation Period (for asynchronous task sets). One convenient way of doing this is to treat the Task Sequence Initialisation Period as a separate system mode.

Please note that the timing of the transition between system modes may not be known in advance (because, for example, the time taken for the plane shown in FIG. 4 to reach cruising height will vary with weather conditions), but this does not alter the design or implementation process. The key feature of all TT designs is that the tasks—whether co-operative or pre-empting, whatever the system mode—are always released according to a schedule that is determined, validated and verified when the system is designed.

We now consider how TT designs are typically implemented in current systems. Further information about this topic can be found in Reference 1 and Reference 8.

Figure 5:
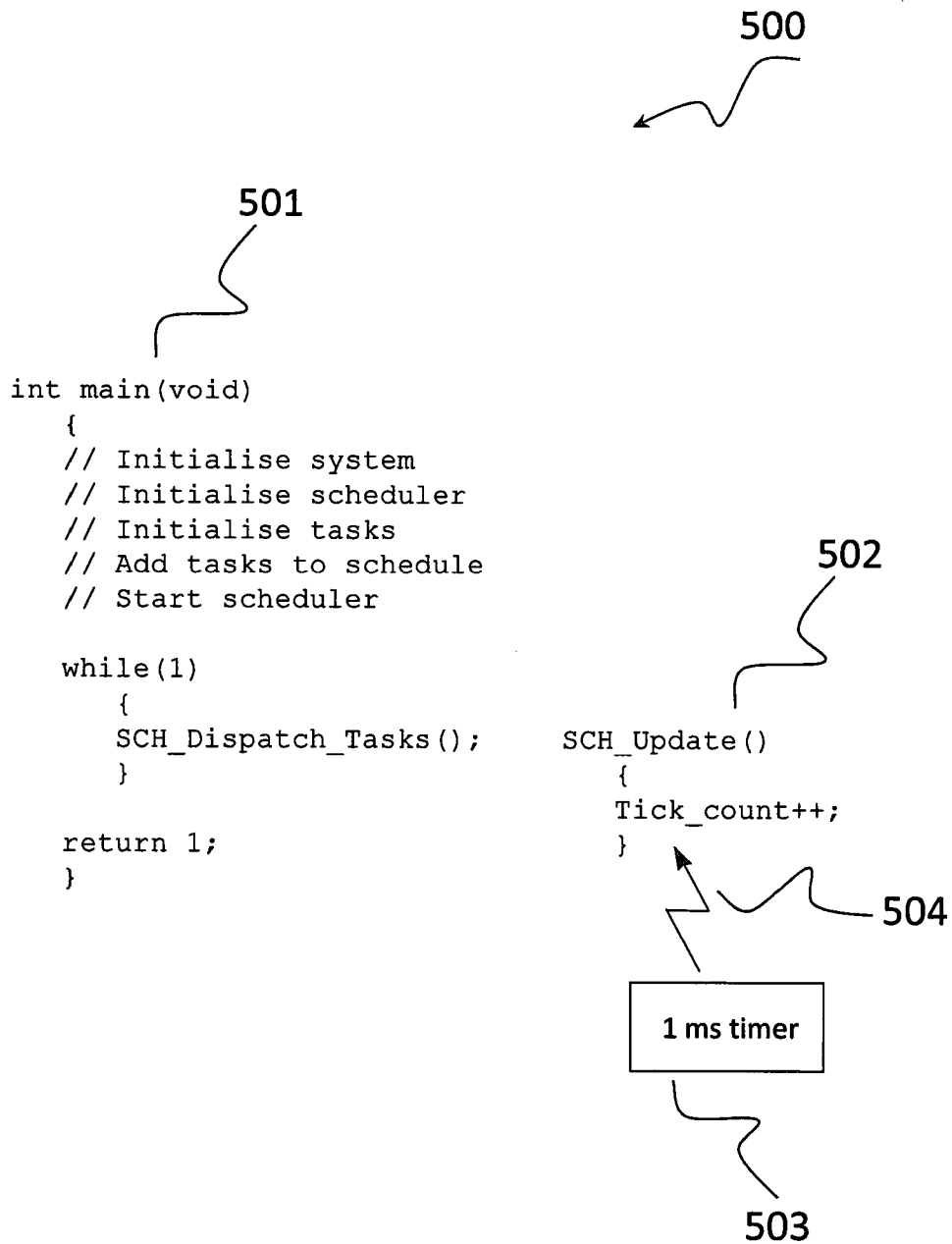
FIG. 5 illustrates in schematic form one possible code framework for a TTC scheduler that might be employed on a Processor.

FIG. 5 shows a schematic representation 500 of the key components in a TTC scheduler. Within the function main( ) 501 we assume that there are functions to initialise the system, initialise the scheduler, initialise the tasks and then add the tasks to the schedule. Function main( ) also includes the task dispatcher function SCH_TTC_Dispatch_Tasks( ) in this example: this releases the tasks at the required times. The second key component of the scheduler is function SCH_Update( ) 502: this is linked—in this example—to a timer 503 that is assumed to generate periodic ticks—that is, timer interrupts 504—every millisecond. The SCH_Update( ) 502 function is responsible for keeping track of elapsed time.

For example, the following code illustrates an example of how three periodic tasks may be configured on a Processor using such a standard TTC scheduler:

```
int main(void)
{
   SYSTEM_Init( );
   SCH_TTC_Init( ); // Set up the scheduler
   // Init tasks ...
   // Add Task_A, Task_B and Task_C to the schedule
   // Parameters: Task name, offset, period
   SCH_TTC_Add_Task(Task_A, 0, 10);
   SCH_TTC_Add_Task(Task_B, 0, 15);
   SCH_TTC_Add_Task(Task_C, 0, 33);
   SCH_TTC_Start( ); // Start the schedule
   while(1)
   {
      SCH_TTC_Dispatch_Tasks( );
   }
   return 1;
}
```

Please note that the code listing above shows a synchronous task set.

The following code listing shows an asynchronous task set:

```
int main(void)
{
   SYSTEM_Init( );
   SCH_TTC_Init( ); // Set up the scheduler
   // Init tasks ...
   // Add Task A, Task_B and Task_C to the schedule
   // Parameters: Task name, offset, period
   SCH_TTC_Add_Task(Task_A, 0, 10);
   SCH_TTC_Add_Task(Task_B, 3, 15);
   SCH_TTC_Add_Task(Task_C, 10, 33);
   SCH_TTC_Start( ); // Start the schedule
   while(1)
   {
      SCH_TTC_Dispatch_Tasks( );
   }
   return 1;
}
```

In both of the code listings presented above (and in FIG. 5, function main( ) 501), the process of releasing the system tasks is carried out in the function SCH_Dispatch_Tasks( ). The operation of a typical SCH_Dispatch( ) function is illustrated schematically in FIG. 6.

Figure 6:
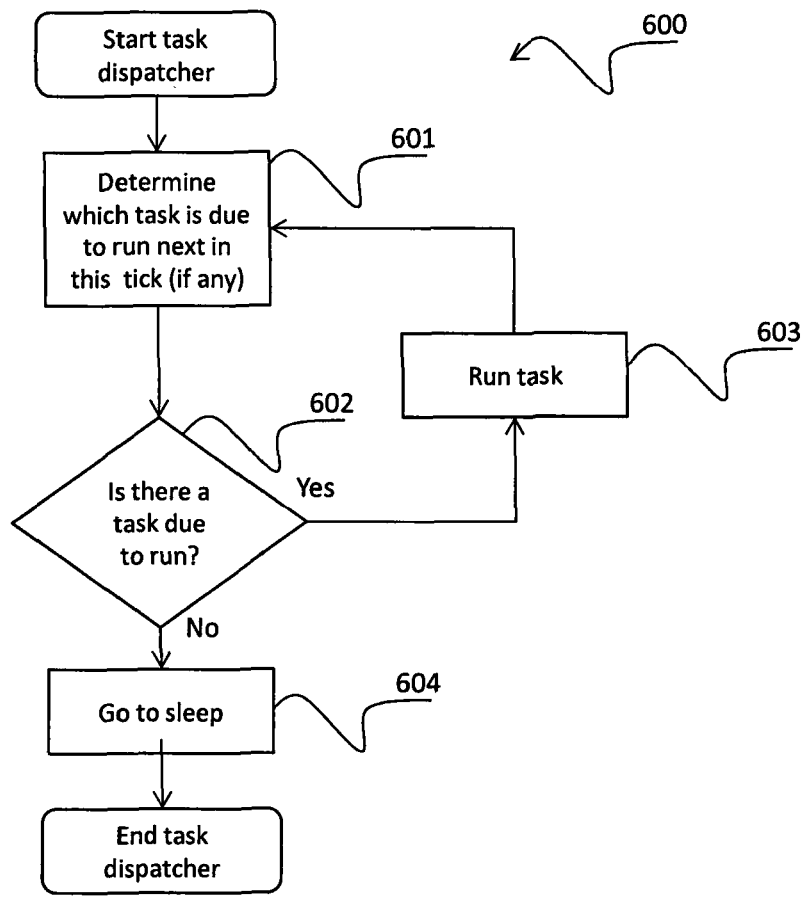
FIG. 6 illustrates in schematic form the operation of a typical task dispatcher function from a TTC or TTH scheduler.

FIG. 6 shows an overview 600 of a task dispatcher function that might be incorporated in a TTC or TTH scheduler. In FIG. 6, the dispatcher begins by determining 601 602 whether there is any task that is currently due to run. If the answer to this question is "yes", the dispatcher runs the task 603. It repeats this process (check 601, 602, run 603) until there are no tasks remaining that are due to run. The dispatcher then puts the processor to sleep 604: that is, it places the processor into a power-saving mode. The processor will remain in this power-saving mode until awakened by the next timer interrupt: at this point the timer ISR 502 (FIG. 5) will be called again, followed by the next call to the dispatcher function 600 (FIG. 6).

Referring again to FIG. 5, it should be noted that there is a deliberate split between the process of timer updates 502 and the process of task dispatching (in main( ) 501, and described in more detail in FIG. 6). This split means that it is possible for the scheduler to execute tasks that are longer than one tick interval without missing timer ticks. This gives greater flexibility in the system design, by allowing use of a short tick interval (which can make the system more responsive) and longer tasks (which can—for example—simplify the design process). Although this flexibility is available, many (but not all) TTC systems are designed to ensure that no tasks are running when a timer interrupt occurs: however, even in such designs, a run-time error may mean that a task takes longer to complete. Because of the dynamic nature of the scheduler, the system may be able to recover from such run-time errors, provided that the error is not permanent (and the transient error itself can be tolerated).

Flexibility in the design process and the ability to recover from transient errors are two reasons why "dynamic" TT designs (with a separate timer ISR and task dispatch functions) are generally preferred over simpler designs in which tasks are dispatched from the timer ISR. In addition, separating the ISR and task dispatch functions also makes it very simple to create TT designs with support for task pre-emption (sometimes called "time-triggered hybrid"—TTH—designs).

Figure 7:
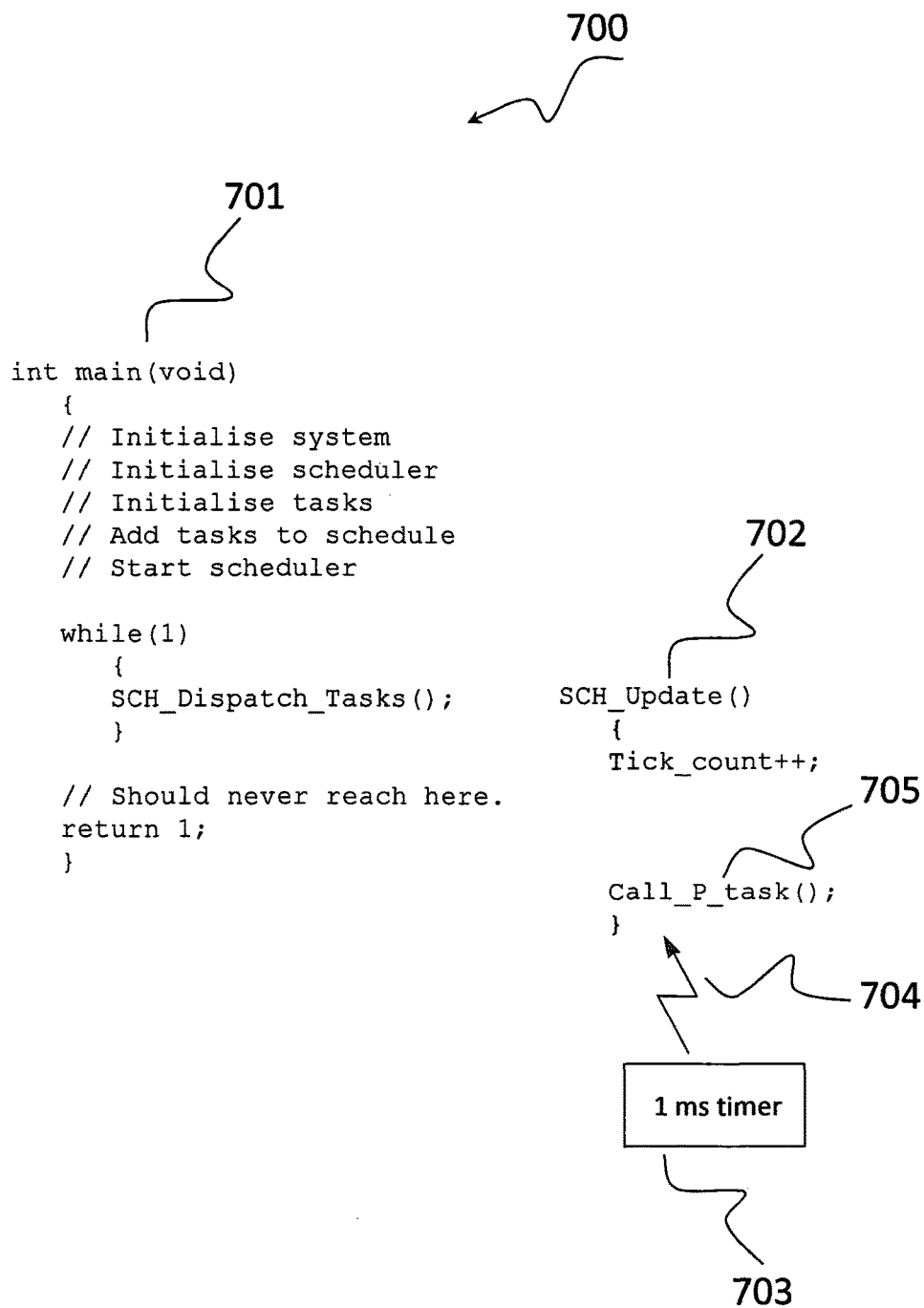
FIG. 7 illustrates in schematic form one possible code framework for a TTH scheduler that might be employed on a Processor.

As an example of a TTH scheduler design, please see FIG. 7. This figure shows a schematic view 700 of a typical TTH scheduler implementation. As with the TTC design (in FIG. 5), the TTH design incorporates a main( ) function 701 with a task dispatcher, and a SCH_Update( ) function 702. Also like the TTC design 500, the TTH design 700 links a timer 703—which generates periodic interrupts 704—to the SCH_Update function 702. The only difference between the TTC implementation in FIG. 5 and the TTH implementation in FIG. 6 is that the TTH implementation includes a call to a pre-empting task (function) 705 within the timer ISR.

Please see Reference 1 and Reference 8 for further information about the implementation of different forms of conventional TT scheduler.

We now consider how tasks are implemented in a typical TT design.

Reference 1 and Reference 8 provide non-limiting examples of the kinds of tasks that may be executed in TT systems, for example "RS-232 data transmission", "display updates" and "PID control" tasks, including full implementation details. Other examples of tasks may involve reading input data, performing calculations and generating outputs.

We now describe how the present invention can be implemented in order to improve the reliability and security of computer systems that have been configured to run tasks according to a predetermined task schedule.

Figure 8:
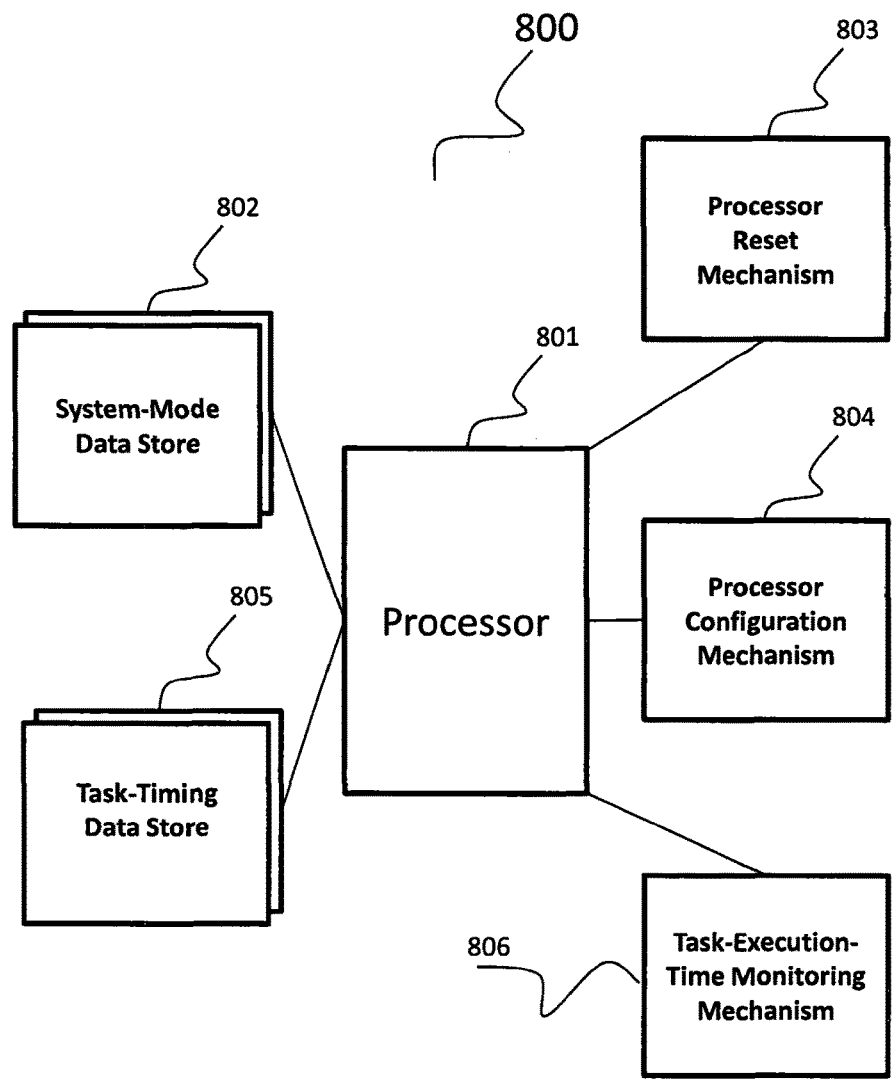
FIG. 8 illustrates in schematic form an embodiment of a time-triggered computer system which comprises a Processor, a System-Mode Data Store (adapted to store information about the next system mode that the system is required to operate in), a Processor Reset Mechanism (adapted to reset the Processor when it is necessary to change the system mode), a Processor Configuration Mechanism (adapted to configure the Processor in accordance with the required system mode after a Processor reset, using information stored in the System-Mode Data Store), a Task-Timing Data Store (adapted to store the Task WCET Limit and/or the Task BCET Limit for one or more tasks that are executed by the Processor) and a Task-Execution-Time Monitoring Mechanism (adapted to monitor the execution time of tasks that are executed by the Processor and take corrective action, by means of the Processor Reset Mechanism and the Processor Configuration Mechanism, if the task breaches its pre-determined Task WCET Limit or Task BCET Limit), in accordance with an aspect of the present invention.

FIG. 8 illustrates in schematic form 800 an embodiment of a time-triggered computer system which comprises a Processor 801, a System-Mode Data Store 802 (adapted to store information about the next system mode that the system is required to operate in), a Processor Reset Mechanism 803 (adapted to reset the Processor 801 when it is necessary to change the system mode), a Processor Configuration Mechanism 804 (adapted to configure the Processor 801 in accordance with the required system mode after a Processor reset, using information stored in the System-Mode Data Store 802), a Task-Timing Data Store 805 (adapted to store information comprising the Task WCET Limit and/or Task BCET Limit for one or more tasks that are executed by the Processor 801) and a Task-Execution-Time Monitoring Mechanism 806 (adapted to monitor the execution time of tasks that are executed by the Processor 801 and take corrective action, by means of the Processor Reset Mechanism 803 and the Processor Configuration Mechanism 804, if the task breaches its pre-determined Task WCET Limit or Task BCET Limit), in accordance with an aspect of the present invention.

The Processor 801 may comprise one or more "soft" or "hard" processor cores (that execute some software) and/or one or more hardware cores (that do not execute any software).

The Processor 801 may comprise one or more processor chips, such as a commercial-off-the-shelf (COTS) microcontroller or microprocessor, Digital Signal Processor (DSP), Field-Programmable Gate Array (FPGA), Application Specific Integrated Circuit (ASIC) or similar device.

As a non-limiting example, the Processor 801 may be implemented using an NXP LPC1769 microcontroller. This is a typical example of a modern 32-bit microcontroller, and we will use this as a platform for a non-limiting example in the description that follows.

In this non-limiting example, the computer system operates in one of the following (four) system modes: {FAIL_SILENT, MODE_01, MODE_02, MODE_03}

In this example, FAIL_SILENT is an "error" mode in which it is intended that the computer system is placed in a safe state. Such a safe state may be one in which—for example—the output pins of the Processor are set to levels that ensure that the any external equipment that is under the control of the computer system is shut down. In many designs, the system will be expected to remain in this safe state until a qualified technical expert inspects it.

Preferably, the Processor 801 comprises a time-triggered scheduler.

Optionally, the Processor 801 comprises a time triggered cooperative (TTC) scheduler or a time triggered hybrid (TTH) scheduler, as described in detail in Reference 1.

Figure 9:
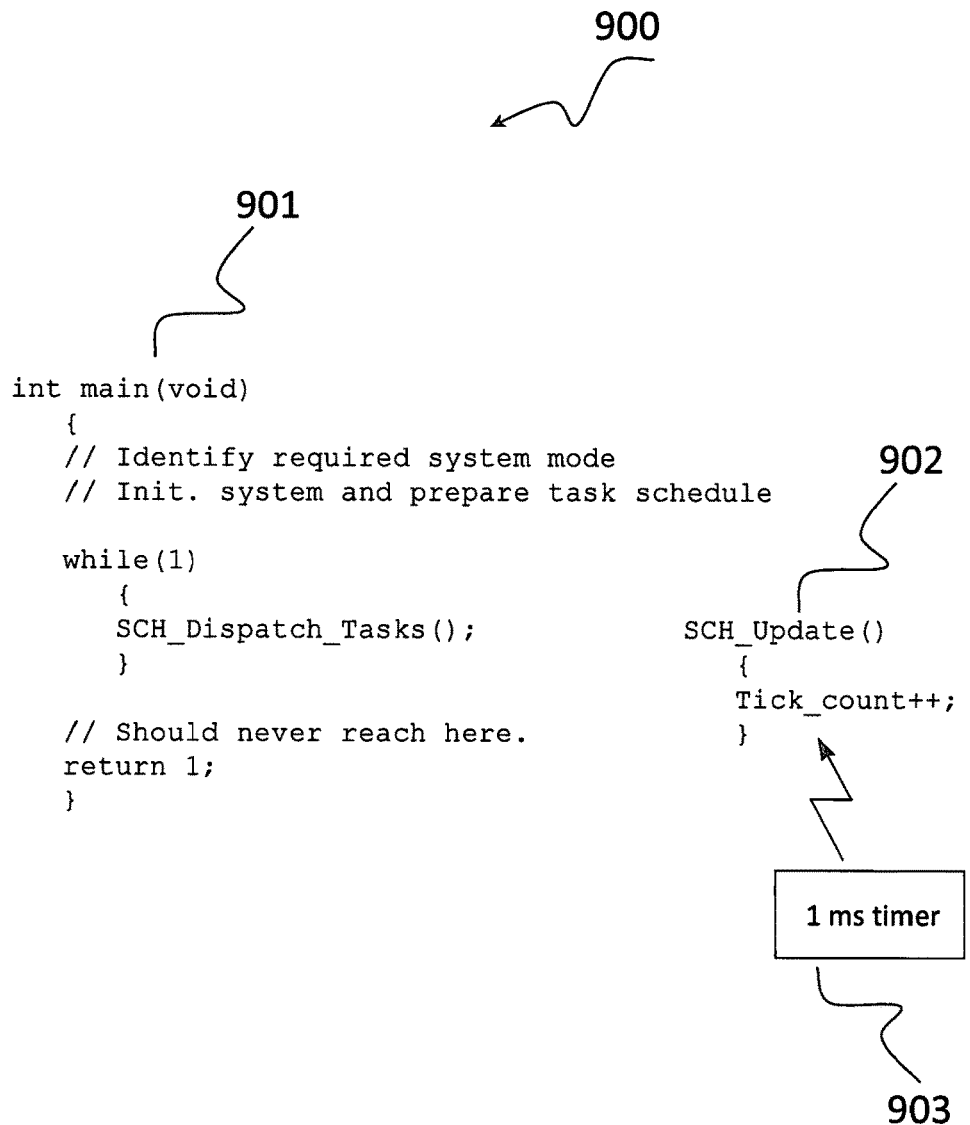
FIG. 9 illustrates in schematic form the operation of software that might be executed on the Processor illustrated in FIG. 8, in accordance with an aspect of the present invention.

FIG. 9 illustrates in schematic form the operation of software 900 that might be executed on the Processor 801 illustrated in FIG. 8, in accordance with an aspect of the present invention;

In FIG. 9, a TTC software architecture is illustrated 900. This comprises the function main( ) 901, in which the required system mode is determined and the system in initialised: this process of initialisation includes preparing the required task schedule. Following this initialisation phase, the task dispatcher (SCH_Dispatch_Tasks( )) is then executed. In addition, the function SCH_Update( ) 902 is used to keep track of the elapsed time.

In the non-limiting LPC1769 example introduced above, the Processor 801 comprises an NXP LPC1769 microcontroller executing a TTC scheduler: the scheduler is extended from the design presented in Reference 1 in a manner that is in accordance with the present invention.

In this non-limiting example, function main( ) takes the following form:

```
int main(void)
{
    // Check mode, add tasks to schedule
    SYSTEM_Init( );
    // Start the scheduler
    SCH_Start( );
    while(1)
    {
        SCH_Dispatch_Tasks( );
    }
    return 1;
}
```

Preferably, the System-Mode Data Store 802 will comprise one or more non-volatile memory devices, such as battery-backed Random Access Memory (RAM), Flash memory or Electrically-Erasable Programmable Read-Only Memory (EEPROM).

In the non-limiting LPC1769 example introduced above, the System-Mode Data Store 802 is based on non-volatile RAM memory that is incorporated in the LPC1769 microcontroller (and will be supported by battery backup in most designs). The specific registers used in the example presented here are as follows:
LPC_RTC→GPREG0
LPC_RTC→GPREG1
LPC_RTC→GPREG2
LPC_RTC→GPREG3
LPC_RTC→GPREG4

Optionally, any or all information held in the System-Mode Data Store 802 will be copied two or more times across one or more physical data storage devices: for example, a single item of data may be copied in two different battery-back RAM devices. Where two copies of a particular data item are stored, the intention is that this may allow the Processor 801 to detect corruption of the data item: such corruption might be caused, for example, by EMI or by radiation, or by deliberate tampering. Where three or more copies of a particular data item are stored, the intention is that this may allow the Processor 801 to correct for errors in the data item (for example, through use of a standard "majority voting" algorithm).

The option for duplicating information held in the System-Mode Data Store 802 is not incorporated in the non-limiting LPC1769 example.

Preferably, the Processor Reset Mechanism 803 will comprise a "watchdog timer" mechanism that is refreshed (or "fed") regularly under normal circumstances, but which is not refreshed—and therefore causes the Processor 801 to be reset—when an error occurs, or when there is some other reason to change the system mode.

In the non-limiting LPC1769 example introduced above, the Processor Reset Mechanism 803 is based on the use of the internal watchdog timer (WDT) unit on the LPC1769. Under normal circumstances, the WDT in this non-limiting example is refreshed by means of the WATCHDOG_Update( ) task listed below:

```
void WATCHDOG_Update(void)
{
// Feed the watchdog
LPC_WDT->WDFEED = 0xAA;
LPC_WDT->WDFEED = 0x55;
}
```

In this non-limiting example, the WDT is used to enforce a reset under the following circumstances: [i] when the system mode is to be changed from one normal system mode (e.g. MODE_01) to another normal system mode (e.g. MODE_02); [ii] when a task breaches its predetermined Task WCET Limit; [iii] when a task breaches its predetermined Task BCET Limit; [iv] in the event of any other form of (unknown) error that has the result that the WATCHDOG_Update( ) function is not called at the required rate.

Preferably, the Processor Configuration Mechanism 804 will comprise software routines or other mechanisms that are executed after the Processor 801 is reset and before the Processor 801 begins to execute any tasks, such software routines or other mechanisms being used to configure the system in accordance with one of the two or more predetermined system modes.

Preferably, the Processor Configuration Mechanism 804 will comprise software routines or other mechanisms for reading from the System-Mode Data Store 802 in order to determine which predetermined system mode the system should be configured in.

In the non-limiting LPC1769 example introduced above, the Processor Configuration Mechanism 804 is implemented by means of the function SYSTEM_Init( ): as noted previously, this function is called from main( ). The function SYSTEM_Init( ) is listed below:

```
void SYSTEM_Init(void)
{
    SYSTEM_Identify_Required_Mode( );
    SYSTEM_Configure_Required_Mode( );
}
```

As will be appreciated from the code above, the system initialisation process in this non-limiting example involves calls to two further functions. A possible embodiment of the first of these functions (in this non-limiting example)—SYSTEM_Identify_Required_Mode( )—is listed below:

```
void SYSTEM_Identify_Required_Mode(void)
{
    uint32_t Watchdog_flag;
    // Required system mode (from GPREG0 after reset)
    uint32_t Required_system_mode;
    // Latest reset ID code (from GPREG1)
    uint32_t Late_reset_id;
    // Previous reset ID code (from GPREG2)
    uint32_t Prev_reset_id;
    // ID of latest task with timing error (from GPREG3)
    uint32_t Late_task_t_error_id;
    // ID of previous task with timing error (from GPREG4)
    uint32_t Prev_task_t_error_id;
    // If "1", reset was caused by WDT
    Watchdog_flag = (LPC_SC->RSID >> 2) & 1;
    if (Watchdog_flag != 1)
    {
        // A "normal" system start (not WDT reset)
        // Here we treat all such resets in the same way
        // Set system Mode_01
        System_mode_G = MODE_01;
        // Store "fail silent" mode as default
        // - used in absence of any other error information
        LPC_RTC->GPREG0 = FAIL_SILENT;
        // Set default values for latest reset ID
        // ... and previous reset ID.
        LPC_RTC->GPREG1 = SYS_UNKNOWN_ERROR;
        LPC_RTC->GPREG2 = SYS_UNKNOWN_ERROR;
        // Also set defaults for the tasks with timing errors
        LPC_RTC->GPREG3 = SYS_MAX_TASKS;   // Invalid value
        LPC_RTC->GPREG4 = SYS_MAX_TASKS;   // Invalid value
        return;
    }
    // If we are here, reset was caused by WDT
    // First, clear the WDT (hardware) flag
    // (or other resets may be interpreted as WDT)
    LPC_SC->RSID &= ~(0x04);
    // Find out what we can about the previous runs
    // First, recover system mode information (if any)
    // (May be from a mode change request,
    // or a previous error in this mode)
    Required_system_mode = LPC_RTC->GPREG0;
    // Check that the system mode is valid
    if (!((Required_system_mode == FAIL_SILENT) ||
          (Required_system_mode == MODE_01) ||
          (Required_system_mode == MODE_02) ||
          (Required_system_mode == MODE_03)))
    {
```

```
            // System mode is not valid ...
            // Set the system mode to "Fail Silent"
            System_mode_G = FAIL_SILENT;
            return;
        }
        // If the required mode is "fail silent",
        // ... we don't need to do anything more
        if (Required_system_mode == FAIL_SILENT)
        {
            System_mode_G = FAIL_SILENT;
            return;
        }
        // If we are here, the system mode is valid
        // (and NOT "fail silent")
        // We now try to identify the cause of the reset
        Late_reset_id = LPC_RTC->GPREG1;
        Prev_reset_id = LPC_RTC->GPREG2;
        // Check for errors (latest reset)
        if (!((Late_reset_id == SYS_REQUEST_MODE_CHANGE) ||
              (Late_reset_id == SYS_TASK_TIMING_ERROR) ||
              (Late_reset_id == SYS_UNKNOWN_ERROR)))
        {
            // Reset cause is not valid ...
            // Set the system mode to "Fail Silent"
            System_mode_G = FAIL_SILENT;
            return;
        }
        // If we are here, we know cause of the most recent reset
        // We now deal with requested mode changes
        if (Late_reset_id == SYS_REQUEST_MODE_CHANGE)
        {
            // Set the new mode as required
            System_mode_G = Required_system_mode;
            // Store "fail silent" mode as future default
            LPC_RTC->GPREG0 = FAIL_SILENT;
            // Set default values for latest reset ID (unknown)
            LPC_RTC->GPREG1 = SYS_UNKNOWN_ERROR;
            // Update previous reset ID
            LPC_RTC->GPREG2 = SYS_REQUEST_MODE_CHANGE;
            // Also set defaults for the tasks with timing errors
            LPC_RTC->GPREG3 = SYS_MAX_TASKS;     // Invalid value
            LPC_RTC->GPREG4 = SYS_MAX_TASKS;     // Invalid value
            return;
        }
        // If the reset was caused by the WDT,
        // (without any other error information provided)
        // then something is badly wrong
        if (Late_reset_id == SYS_UNKNOWN_ERROR)
        {
            // Set the system mode to "Fail Silent"
            System_mode_G = FAIL_SILENT;
            return;
        }
        // We also need to check for errors with the prev. reset
        if (!((Prev_reset_id == SYS_REQUEST_MODE_CHANGE) ||
              (Prev_reset_id == SYS_TASK_TIMING_ERROR) ||
              (Prev_reset_id == SYS_UNKNOWN_ERROR)))
        {
            // Reset cause is not valid ...
            // Set the system mode to "Fail Silent"
            System_mode_G = FAIL_SILENT;
            return;
        }
        // If we are here, we know cause of the last two resets
        // Now we deal with TETMM errors
        // Here we want to avoid repeated restarts
        // where the same task keeps demonstrating timing errors
        // This means that we may need to consider
        // not only two recent error sources
        // but also two task IDs.
        // We recover the IDs of the tasks that had timing errors
        Late_task_t_error_id = LPC_RTC->GPREG3;
        Prev_task_t_error_id = LPC_RTC->GPREG4;
        if (Late_reset_id == SYS_TASK_TIMING_ERROR)
        {
            if (Late_task_t_error_id >= SYS_MAX_TASKS)
            {
                // Should have valid task ID - serious error
                // Set the system mode to "Fail Silent"
                System_mode_G = FAIL_SILENT;
                return;
            }
        }
        if (Prev_reset_id == SYS_TASK_TIMING_ERROR)
        {
            if (Prev_task_t_error_id >= SYS_MAX_TASKS)
            {
                // Should have valid task ID - serious error
                // Set the system mode to "Fail Silent"
                System_mode_G = FAIL_SILENT;
                return;
            }
        }
        // If we are here, then we have valid data to work with
        // Check to see if the same task
        // (or both task and backup)
        // have generated timing errors more than once
        if ((Late_reset_id == SYS_TASK_TIMING_ERROR) &&
            (Prev_reset_id == SYS_TASK_TIMING_ERROR) &&
            (Late_task_t_error_id ==
             Prev_task_t_error_id))
        {
            // We appear to have a serious problem
            // with this task / task combination
            // Set the system mode to "Fail Silent"
            System_mode_G = FAIL_SILENT;
            return;
        }
        // If we've got this far, then we have to deal with a
        // single task-timing error (only)
        if (Late_reset_id == SYS_TASK_TIMING_ERROR)
        {
            // Set flag to indicate timing error
            T_error_flag_G = 1;
            // Store ID of task with timing error
            T_error_task_id_G = LPC_RTC->GPREG3;
            // Set the new mode as required
            System_mode_G = Required_system_mode;
            // Store "fail silent" mode as default
            LPC_RTC->GPREG0 = FAIL_SILENT;
            // Set default values for current reset ID
            LPC_RTC->GPREG1 = SYS_UNKNOWN_ERROR;
            // Update previous reset ID
            LPC_RTC->GPREG2 = SYS_TASK_TIMING_ERROR;
            // Also tidy up task ID information
            LPC_RTC->GPREG3 = SYS_MAX_TASKS;              // Default
            LPC_RTC->GPREG4 = T_error_task_id_G;   // Store
            return;
        }
}
```

In this non-limiting example, function SYSTEM_Identify_Required_Mode( ) begins by checking the cause of the system reset.

In this non-limiting example, the variable Watchdog_flag will be set (to a non-zero value) if the reset was caused by the WDT. The reasons for a WDT reset in this example have already been summarised.

If the reset was not caused by the WDT then—in this non-limiting example—the cause of the reset was a power-on reset, a brown-out related reset, or a reset triggered by the system reset pin (sometimes called a "warm" reset). In each of these circumstances, in this example, the system is set to operate in MODE_01, by means of an assignment to the variable System_mode_G. Default values for the various non-volatile registers (that are used to transfer information between system modes, when the processor is reset) are then applied.

If the reset was caused by the WDT, then the cause of the reset is determined by examining the values of the various non-volatile registers. Note that this process is—necessarily—fairly lengthy in this example, because all of the values retrieved from the registers are checked for errors before they are used.

By the conclusion of the function SYSTEM_Identify_Required_Mode( ) in this example, the required system system mode has been identified.

The second part of the system initialisation process in this non-limiting example involves calling the function SYSTEM_Configure_Required_Mode( ). A possible embodiment of this function (for the purposes of this non-limiting example) is listed below:

```
void SYSTEM_Configure_Required_Mode(void)
{
// Index in task array
uint32_t Index;
switch (System_mode_G)
    {
    case FAIL_SILENT:
        {
        // Serious error
        SYSTEM_Set_Fail_Silent_State( );
        while(1);
        break;
        }
    case MODE_01:
        {
        // Set up scheduler for 1 ms ticks
        SCH_Init(1000);
        // Prepare for heartbeat tasks
        HEARTBEAT_Init( );
        SPI_7_Seg_Init( );
        // Set up WDT
        // Parameter is WDT overflow (microseconds)
        WATCHDOG_Init(5000);
        // Add all the tasks
        // Start with "heartbeat" task
        Index =
        SCH_Add_Task(HEARTBEAT_Update,  // Main task
                     0,                  // Offset (ticks)
                     1000,               // Period (ticks)
                     100,                // WCET (μs)
                     60);                // BCET (μs)
        // This task has a backup
        // (Task will be replaced with backup
        // in the event that timing errors are detected)
        SCH_Add_Backup_Task(Index, // Position in array
                            HEARTBEAT_Update2,  // Task
                            100,                // WCET (μs)
                            50);                // BCET (μs)
        // Add counting task
        SCH_Add_Task(SPI_7_Seg_Update,  // Main task
                     1,                  // Offset (ticks)
                     1000,               // Period (ticks)
                     500,                // WCET (μs)
                     0);                 // BCET (μs)
        // Where there is no backup task
        // and the task generates a timing error,
        // the task will be allowed to run again:
        // if the error is repeated, the
        // system will enter "Fail Silent" mode
        // Add "change mode" demo task
        SCH_Add_Task(SYSTEM_Demo,       // Main task
                     2,                  // Delay (ticks)
                     5000,               // Period (ticks)
                     100,                // WCET (μs)
                     0);                 // BCET (μs)
        // Add Watchdog task
        SCH_Add_Task(WATCHDOG_Update,   // Main task
                     3,                  // Offset (ticks)
                     1,                  // Period (ticks)
                     10,                 // WCET (μs)
                     0);                 // BCET (μs)
        // Now see if a task had timing errors previously
        if (T_error_flag_G == 1)
            {
            // Replace task with backup (if available)
            SCH_Replace_Task(T_error_task_id_G);
            }
        // Feed the watchdog
        WATCHDOG_Update( );
        break;
        }
    case MODE_02:
        {
        // As for MODE_01 (but different task set)
        // Details omitted here.
        }
    case MODE_03:
        {
        // As for MODE_01 (but different task set)
        // Details omitted here.
        }
    }
}
```

In this non-limiting example, the core of the function is a "switch" statement that configures the system in one of the (four) valid system modes, based on the value of the global variable System_Mode_G: this value is set in the function SYSTEM_Identify_Required_Mode( ) that was discussed previously.

The core of the function SYSTEM_Configure_Required_Mode( ) in this non-limiting example is therefore as follows:

```
void SYSTEM_Configure_Required_Mode(void)
{
switch (System_mode_G)
    {
    case FAIL_SILENT:
        {
        }
    case MODE_01:
        {
        }
    case MODE_02:
        {
        }
    case MODE_03:
        {
        }
    }
}
```

In many designs, tasks will be added to the schedule in each mode using a conventional scheduler interface (e.g. SCH_Add_Task( )), as discussed previously.

It will be appreciated that—in this non-limiting example—a complete set of tasks is added in each mode, and that there are no calls to SCH_Add_Tasks( ) anywhere else in the program. It will also be appreciated that—in this non-limiting example—there are no calls to the conventional interface function SCH_Delete_Task( ) at any point in the user code. In this way, it is possible to avoid the reliability and security problems that can be caused by the rather piecemeal approach to adding and removing individual tasks that can often be seen in conventional time-triggered (TT) computer systems (as discussed elsewhere in this document).

Preferably, the Task-Timing Data Store 805 will comprise one or more non-volatile memory devices, such as battery-back Random Access Memory (RAM), Flash memory or Electrically-Erasable Programmable Read-Only Memory (EEPROM).

In the non-limiting LPC1769 example introduced above, a user-defined type is used to store the information about each task (including the task timing data):

```
// User-define type to store required data for each task
typedef struct
{
    // Pointer to the task (must be a 'void (void)' function)
    void (*pTask) ( );
    // Delay (ticks) until the task will (next) be run
    // - see SCH_Add_Task( ) for further details
    uint32_t Delay;
    // Interval (ticks) between subsequent runs.
    // - see SCH_Add_Task( ) for further details
    uint32_t Period;
    // Worst-case execution time (microseconds)
    uint32_t WCET;
    // Best-case execution time (microseconds)
    uint32_t BCET;
    // Incremented (by scheduler) when task is due to execute
    uint32_t RunMe;
} sTask;
```

Two arrays of tasks are then maintained: one array of "normal" tasks, and one array of "backup" tasks:

```
// Array of tasks
sTask SCH_tasks_G[SYS_MAX_TASKS];
// Array of backup tasks
sTask SCH_backup_tasks_G[SYS_MAX_TASKS];
```

In each case, SCH_MAX_TASKS represents the maximum number of tasks in the system (as is the case in the designs in Reference 1).

It will be appreciated that—in this non-limiting example—the timing information for each task (that is, the Task WCET Limit, stored in the field "WCET" and the Task BCET Limit, stored in the field "BCET") are incorporated in variables of the user-defined type sTask. These predefined timing values are stored in the related task arrays (SCH_tasks_G and SCH_backup_tasks_G) at design time and transferred to the computer system as part of the LPC1769 code.

It will also be appreciated that the process of populating the arrays SCH_tasks_G[ ] and SCH_backup_tasks_G[ ] has already been illustrated in the non-limiting LPC1769 example, in the function SYSTEM_Configure_Required_Mode( ).

Other representations of the task timing information are—of course—possible: for example, the task timing information may be represented in separate arrays. Such a representation might—as a non-limiting example—take the following form:

```
Task_WCET_Limits[SCH_MAX_TASKS];
Task_BCET_Limits[SCH_MAX_TASKS];
```

Optionally, any or all information held in the Task-Timing Data Store 805 will be copied two or more times across one or more physical data storage devices: for example, a single item of data may be copied in two different battery-back RAM devices. Where two copies of a particular data item are stored, this may allow the Processor 801 to detect corruption of the data item. Where three or more copies of a particular data item are stored, this may allow the Processor 801 to correct for errors in the data item (for example, through use of a standard "majority voting" algorithm).

This option is not incorporated in the non-limiting LPC1769 example (that is, a single copy of the information in the Task-Timing Data Store 805 is maintained).

Preferably, the Task-Timing Data Store 805 will contain the predetermined Task WCET Limit and Task BCET Limit for all tasks that are to be executed by the Processor 801, this information being determined and stored before the computer system begins to operate.

In the non-limiting LPC1769 example introduced above, all of the task timing information is pre-determined (and stored in the "normal" and "backup" task arrays, as listed previously).

Alternatively, the Processor 801 may create at least one Task WCET Limit and/or Task BCET Limit, and store it in the Task-Timing Data Store 805, during the system operation. Such a Task WCET Limit and/or Task BCET Limit may be created by recording the task execution times from the Processor 801 at points during the system operation.

This option is not incorporated in the non-limiting LPC1769 example (that is, the Task WCET Limits and Task BCET Limits are based on information provided at design time rather than at run time in this example).

Optionally, Task WCET Limit and/or Task BCET Limit information will be stored in the Task-Timing Data Store 805 for only a subset of the tasks that are executed by the Processor 801. This may mean, for example, that only the WCET (and not BCET) of certain critical tasks is monitored by the Processor 801, while the operation of non-critical tasks is not monitored at all.

This option is not incorporated in the non-limiting LPC1769 example (that is, timing information is stored for all tasks in this example).

Preferably, the Task-Execution-Time Monitoring Mechanism (TETMM) 806 will comprise a timer that is initialised and configured to generate an interrupt (that is, the Task WCET Limit Interrupt) at a time greater than the Task WCET Limit. This timer may be started when the task is released and stopped when the task completes, if the task completes before the Task WCET Limit Interrupt is triggered.

Preferably, the Task WCET Limit Interrupt will be linked to an Interrupt Service Routine (that is, the Task WCET Limit ISR). If the Task WCET Limit ISR is triggered, this means that the associated task has exceeded its Task WCET Limit. The Task WCET Limit ISR will store information about this overrunning task in the System-Mode Data Store 802 and then force the Processor 801 to reset itself by means of the Processor Reset Mechanism 803.

Preferably, when a task completes its execution without triggering the Task WCET Limit Interrupt, the Processor 801 will call a function (that is, the Minimum Timing Check Routine). Minimum Timing Check Routine may then use timing information obtained from the Task-Execution-Time Monitoring Mechanism 806 to determine whether the task concerned has completed its execution in a time less than its Task BCET Limit: if so, the Task Minimum Timing Check Routine may store information about the underrunning task in the System-Mode Data Store 802 and use the Processor Reset Mechanism 803 to force a change in system mode, in order to handle this task-timing error.

Figure 10:
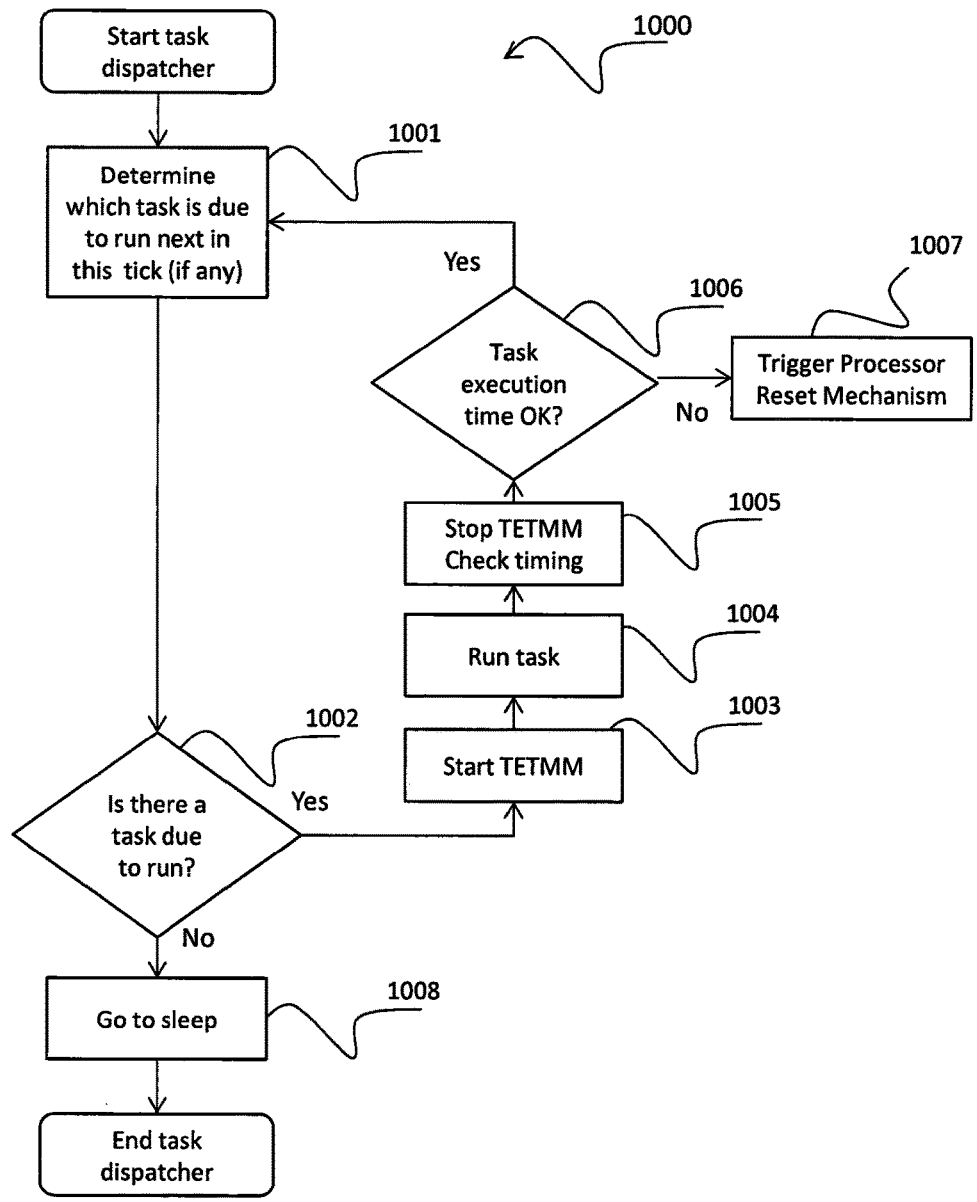
FIG. 10 illustrates in schematic form the operation of a typical task dispatcher function from a TTC or TTH scheduler, which has been modified in accordance with an aspect of the present invention.

FIG. 10 shows a schematic representation of a task dispatcher function that could be employed on the Processor 801 shown in FIG. 8. This task dispatcher should be compared with the conventional version shown in FIG. 6: to be clear: FIG. 6 does not have the benefit of the present invention.

The task dispatcher 1000 shown in FIG. 10 begins by determining 1001 whether there is any task that is currently due to run. If the answer to this question is "yes" 1002, the dispatcher starts the TETMM 1003 before it runs the task

1004. If the task execution completes within the Task WCET Limit, the dispatcher stops the TETMM and checks the execution timing 1005. If the task execution time was less than the Task BCET Limit 1006, then the Processor Reset Mechanism 803 is triggered 1007. If the execution time was greater than or equal to the Task BCET Limit 1006, then the task dispatcher 1000 repeats this process (check 1001, 1002, start TETMM 1003, run task 1004, etc) until there are no tasks remaining that are due to run. The dispatcher then places the processor into a power-saving mode 1008.

In the non-limiting LPC1769 example introduced above, the task dispatcher is implemented as follows:

```
void SCH_Dispatch_Tasks(void)
    {
    uint32_t Index;
    uint32_t Update_required = 0;
    // Need to check for a timer interrupt since this
    // function was last executed
    // (in case idle mode is not being used)
// Disable timer interrupt
// to avoid conflict over shared Tick_count_G
_disable_irq( );
if (Tick_count_G > 0)
    {
    Tick_count_G--;
    Update_required = 1;
    }
// Re-enable timer interrupts
_enable_irq( );
while (Update_required)
    {
    // Go through the task array
    for (Index = 0; Index < SYS_MAX_TASKS; Index++)
        {
        // Check if there is a task at this location
        if (SCH_tasks_G[Index].pTask)
            {
            if (--SCH_tasks_G[Index].Delay == 0)
                {
                // The task is due to run
                // Start the TETMM
                TETMM_I_Start(Index, SCH_tasks_G[Index].WCET,
                              SCH_tasks_G[Index].BCET, 10);
                // Run the task
                (*SCH_tasks_G[Index].pTask)( );    // Run task
                // Stop the internal TETMM
                TETMM_I_Stop( );
                if (SCH_tasks_G[Index].Period != 0)
                    {
                    // Schedule period tasks to run again
                    SCH_tasks_G[Index].Delay =
                                SCH_tasks_G[Index].Period;
                    }
                else
                    {
                    // Delete one-shot tasks
                    SCH_tasks_G[Index].pTask = 0;
                    }
                }
            }
        }
// Disable timer interrupt
_disable_irq( );
if (Tick_count_G > 0)
    {
    Tick_count_G--;
    Update_required = 1;
    }
else
    {
    Update_required = 0;
    }
// Re-enable timer interrupts
_enable_irq( );
    }
// The scheduler may enter idle mode at this point
SCH_Go_To_Sleep( );
}
```

The code follows the structure that will be familiar from conventional implementations (see Reference 1), with the main exception that the example above provides support for an embodiment of the Task-Execution-Time Monitoring Mechanism (TETMM) 806.

In the non-limiting LPC1769 example introduced above, the first interface to the TETMM 806 is via two function calls, before and after the task is released:

```
// Start the TETMM
TETMM_I_Start(...);
// Run the task
(*SCH_tasks_G[Index].pTask)( );    // Run task
// Stop the TETMM
TETMM_I_Stop(...);
```

In this non-limiting example, the TETMM 806 is based on the use on Timer 0 in the LPC1769 microcontroller. When a task is released, Timer 0 is set to trigger an interrupt at a time after the Task WCET Limit for the task concerned, as follows:

```
void TETMM_I_Start(const uint32_t TASK_ID,
                   const uint32_t TASK_WCET_us,
                   const uint32_t TASK_BCET_us,
                   const uint32_t ALLOWED_TIME_VARIATION_us)
{
   Task_ID_G = TASK_ID;
   Task_BCET_G = TASK_BCET_us;
   Task_t_variation_G = ALLOWED_TIME_VARIATION_us;
   /* Timeout value (in microseconds) */
   TMR0_Match.MatchValue
         = (TASK_WCET_us +
            ALLOWED_TIME_VARIATION_us);
   /* Set config. for Tim_config and Tim_MatchConfig */
   TIM_ConfigMatch(LPC_TIM0,   &TMR0_Match);
   /* Enable interrupt for timer 0 */
   NVIC_EnableIRQ(TIMER0_IRQn);
   LPC_TIM0->TCR = 0x02;        /* Reset timer */
   LPC_TIM0->TCR = 0x01;        /* Start timer */
}
```

In this example, the parameter ALLOWED_TIME_VARIATION_us specifies (in microseconds) how long the task is allowed to execute beyond the pre-determined WCET limit before the Timer 0 ISR is triggered. Optionally, this value may be set to 0.

In this non-limiting example, the Minimum Timing Check Routine is implemented by means of the function TETMM_I_Stop( ), as follows:

```
void TETMM_I_Stop (void)
{
   uint32_t Exec_time_us;   // Execution time (microseconds)
   // If we are calling this, the task completed within WCET
   // - Still need to check BCET
   // Stop the timer
   LPC_TIM0->TCR = 0;
   // Check BCET (read timer value)
   // This value is in microseconds
   Exec_time_us = LPC_TIM0->TC;
   if ((Exec_time_us + Task_t_variation_G) < Task_BCET_G)
   {
      // Task has completed too quickly
      // Feed the watchdog
      // (avoid resets while we tidy up)
      WATCHDOG_Update( );
      // Store current system mode in NVRAM
      LPC_RTC->GPREG0 = System_mode_G;
      WATCHDOG_Update( );
      // Store error source in NVRAM
      LPC_RTC->GPREG1 = SYS_TASK_TIMING_ERROR;
      WATCHDOG_Update( );
      // Store the ID of problematic task in NVRAM
      LPC_RTC->GPREG3 = Task_ID_G;
      // Force system reset (assumes WDT enabled)
      while(1);
   }
}
```

Function TETMM_I_Stop( ) checks to see if the task completed too quickly (that is, at a time less than the pre-determined BCET value): if so, an error is recorded and the system is reset, by means of the WDT. Note that—again—some timing variation is permitted in the BCET measurement, if required.

If the task does not complete within the specified WCET limits then the Task WCET Limit ISR may be triggered. In the non-limiting LPC1769 example, the Task WCET Limit ISR is implemented by means of the Timer 0 ISR, as follows:

```
void TIMER0_IRQHandler(void)
{
   // if MR0 interrupt, proceed
   if ((LPC_TIM0->IR & 0x01) == 0x01)
   {
      LPC_TIM0->IR |= 1 << 0;    // Clear MR0 int. flag
      // Keep feeding WDT while we tidy up
      WATCHDOG_Update( );
      // Store current system mode in NVRAM
      LPC_RTC->GPREG0 = System_mode_G;
      WATCHDOG_Update( );
      // Store error source in NVRAM
      LPC_RTC->GPREG1 = SYS_TASK_TIMING_ERROR;
      WATCHDOG_Update( );
      // Store the ID of current problematic task
      LPC_RTC->GPREG3 = Task_ID_G;
      // Force system reset (assumes WDT enabled)
      while(1);
   }
}
```

To complete our description of the non-limiting LPC1769 example, we refer back to FIG. 9. This figure shows the scheduler update function 902, that is linked to a timer interrupt 903.

In the non-limiting LPC1769 example, the scheduler update function is implemented by means of the function SysTick_Handler( ).

```
void SysTick_Handler(void)
{
   // Increment tick count (only)
   Tick_count_G++;
}
```

As in FIG. 9, the scheduler update function listed above is linked to a periodic source of timer interrupts (in this case via the "Systick" timer in the LPC1769 microcontroller).

Optionally, the Task-Execution-Time Monitoring Mechanism 806 will be used to monitor the execution time of multiple tasks at the same time, in TT designs that support task pre-emption.

Figure 11:
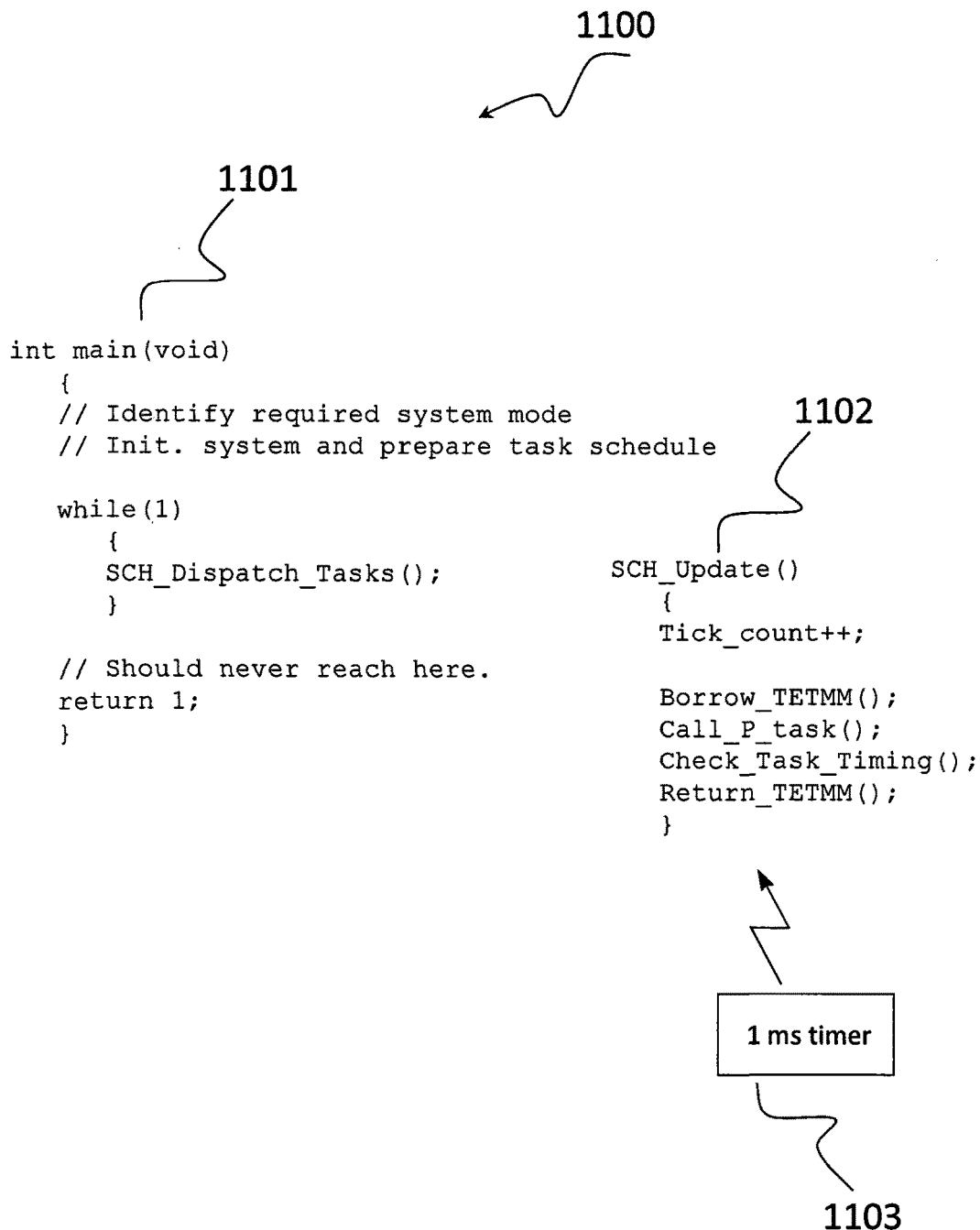
FIG. 11 illustrates in schematic form the operation of software that might be executed on the Processor illustrated in FIG. 8 in situations where a TT architecture with support for task pre-emption is employed in the system, in accordance with an aspect of the present invention.

As an example, FIG. 11 illustrates in schematic form the operation of software that might be executed on the Processor 801 illustrated in FIG. 8 in situations where a TT architecture with support for task pre-emption is employed in the system, in accordance with an aspect of the present invention.

In FIG. 11, the overall system architecture 1100 is the same as that shown in FIG. 7 and FIG. 9. When comparing FIG. 11 and FIG. 9, it will be appreciated that the main differences are in the SCH_Update( ) function 1102.

There are three key function calls involved in the SCH_Update( ) function 1102 in FIG. 11. These are as follows:

```
Borrow_TETMM( );
...
Check_Task_Timing( );
Return_TETMM( );
```

To consider how these function calls might be used, please refer to FIG. 3. Please further assume that the three functions listed above are called when the SCH_Update( ) is invoked by the Tick 1 timer tick.

In this example, the TETMM 806 will already be in use (measuring the execution time of Task A) when Tick 1 is generated. The function Borrow_TETMM( ) will then be responsible for pausing the timing measurement relating to Task A, storing the elapsed time (relating to Task A) and then using the same timer—reset to 0—to start measuring the execution time of Task P.

If Task P exceeds its pre-defined Task WCET Limit then—just as discussed previously in the context of the LPC1769 example—we would expect to call Task WCET Limit ISR, and—thereby—begin a change of system mode.

If Task P does not exceed its pre-defined Task WCET Limit then—after Task P completes—the function Check_Task_Timing( ) will be called. This is an implementation of Minimum Timing Check Routine and is used to check whether Task P breached its Task BCET Limit. If this limit was breached, then—as discussed previously—appropriate error-handling would be carried out, including a change in the system mode.

If Task P completes without breaching either its Task WCET Limit or its Task BCET Limit, then the function Return_TETMM( ) will be called. This function will resume the monitoring of Task A, starting from the point at which this was paused during the call to function Borrow_TETMM( ).

Where required, this process can be readily expanded for use in other, more general "time triggered pre-emptive" (TTP) designs that may employ other timer interrupts with different levels of priority.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

REFERENCES

1. M. J. Pont, "Patterns for Time-Triggered Embedded Systems", Addison-Wesley/ACM Press, 2001.
2. M. J. Pont and H. L. R. Ong "Using watchdog timers to improve the reliability of TTCS embedded systems", in Hruby, P. and Soressen, K. E. [Eds.] *Proceedings of the First Nordic Conference on Pattern Languages of Programs*, September, 2002 ("VikingPloP 2002"), pp. 159-200. Published by Micrsoft Business Solutions. ISBN: 87-7849-769-8, 2003.
3. Willem Smit and Johannes Albertus van Nierkerk "Watchdog timer control circuit with permanent and programmable enablement", European Patent Application EP 0 987 629 A2.
4. Z. M. Hughes and M. J. Pont (2008) "Reducing the impact of task overruns in resource-constrained embedded systems in which a time-triggered software architecture is employed", Transactions of the Institute of Measurement and Control, Vol. 30: pp. 427-450.
5. Michael Joseph Pont and Zemian Mark Hughes "Time-triggered co-operative hardware scheduler", Patent Application WO2007028942A1.
6. Donald Edward Carmon "Monitoring processor execution cycles to prevent task overrun in multi-task, hard, real-time system", U.S. Pat. No. 6,085,218 A.
7. J.-T. Leung and M. Merril. "A note on preemptive scheduling of periodic real-time tasks", Information Processing Letters, 3(11), 1980.
8. M. J. Pont, "Embedded C", Addison-Wesley, 2002.

The invention claimed is:

1. A time-triggered computer system comprising:
    a Processor adapted to operate in one of two or more predetermined system modes, in each of which it will execute one or more tasks according to a predetermined task schedule;
    a System-Mode Data Store adapted to store information about the next system mode that the system is required to operate in;
    a Processor Reset Mechanism adapted to reset the Processor when it is necessary to change the system mode;
    a Processor Configuration Mechanism adapted to configure the Processor in accordance with the required system mode after a reset, using information stored in the System-Mode Data Store;
    a Task-Timing Data Store adapted to store information comprising one or both of a Task WCET Limit (worst-case execution time limit) and a Task BCET Limit (best-case execution time limit) for one or more tasks that are executed by the Processor; and
    a Task-Execution-Time Monitoring Mechanism adapted to monitor an execution time of one or more tasks that are executed by the Processor and take corrective action, by utilizing the Processor Reset Mechanism and the Processor Configuration Mechanism, if a given task of the one or more tasks breaches at least one of the corresponding Task WCET Limit and the corresponding Task BCET Limit;
    wherein the Task-Execution-Time Monitoring Mechanism comprises a timer that is initialised and configured to generate a Task WCET Limit Interrupt at a time greater than the Task WCET Limit, the timer being started when the given task is released and stopped when the given task completes, if the given task completes before the Task WCET Limit Interrupt is generated.

2. The computer system according to claim 1 wherein the Processor comprises at least one core selected from the group consisting of a soft processor core that executes software, a hard processor core that executes software, and a hardware core that does not execute any software.

3. The computer system according to claim 1 wherein the Processor comprises one or more devices selected from the group consisting of processor chips, Digital Signal Processor (DSP), Field-Programmable Gate Array (FPGA), and Application Specific Integrated Circuit (ASIC).

4. The computer system according to claim 1 wherein the Processor comprises a time-triggered scheduler.

5. The computer system according to claim 4 wherein the Processor comprises a time-triggered cooperative (TTC) scheduler or a time-triggered hybrid (TTH) scheduler.

6. The computer system according to claim 1 wherein the System-Mode Data Store comprises one or more non-volatile memory devices.

7. The computer system according to claim 1 wherein information held in the System-Mode Data Store is copied two or more times across one or more physical data storage devices.

8. The computer system according to claim 1 wherein the Processor Reset Mechanism comprises a "watchdog timer" mechanism that is refreshed regularly under normal circumstances, but which is not refreshed when an error occurs, and thereby causes the Processor to be reset.

9. The computer system according to claim 1 wherein the Processor Configuration Mechanism comprises software routines that are executed after the Processor is reset and before the Processor begins to execute any tasks, such software routines being used to configure the computer system in accordance with one of the two or more predetermined system modes.

10. The computer system according to claim 1 wherein the Processor Configuration Mechanism comprises software routines for reading from the System-Mode Data Store in order to determine which predetermined system mode the computer system should be configured in.

11. The computer system according to claim 1 wherein the Task-Timing Data Store comprises one or more non-volatile memory devices.

12. The computer system according to claim 1 wherein information held in the Task-Timing Data Store is copied two or more times across one or more physical data storage devices.

13. The computer system according to claim 1 wherein the Task-Timing Data Store comprises the Task WCET Limit and the Task BCET Limit for every task that is to be executed by the Processor, this information being determined and stored before the computer system begins to operate.

14. The computer system according to claim 1 wherein at least one of the Task WCET Limit and the Task BCET Limit is created by the Processor and stored in the Task-Timing Data Store during operation of the computer system.

15. The computer system according to claim 14 wherein the at least one of the Task WCET Limit and the Task BCET Limit is created by recording the execution time from the Processor at points during operation of the computer system.

16. The computer system according to claim 1 wherein one or both of the Task WCET Limit and the Task BCET Limit information is stored in the Task-Timing Data Store for only a subset of the tasks that are executed by the Processor.

17. The computer system according to claim 1 wherein the Task WCET Limit Interrupt is linked to an Interrupt Service Routine which stores information about the given task that has exceeded the corresponding Task WCET Limit in the System-Mode Data Store and then forces the Processor to reset by means of the Processor Reset Mechanism.

18. The computer system according to claim 1 wherein, when the task completes its execution without triggering the Task WCET Limit Interrupt, the Processor calls a Minimum Timing Check Routine.

19. The computer system according to claim 18 wherein the Minimum Timing Check Routine uses timing information obtained from the Task-Execution-Time Monitoring Mechanism to determine whether the given task has completed execution in a time less than the corresponding Task BCET Limit and, if so, the Minimum Timing Check Routine stores information about the given task that has completed execution in a time less than the corresponding Task BCET Limit in the System-Mode Data Store and uses the Processor Reset Mechanism to force a change in system mode.

20. The computer system according to claim 1 wherein the Task-Execution-Time Monitoring Mechanism is used to monitor the execution time of multiple tasks at the same time.

21. A method of controlling a time-triggered computer system that has been adapted to operate in one of two or more system modes, in each of which the computer system will execute one or more tasks according to a predetermined task schedule, the method comprising the steps of:
configuring the computer system in accordance with an appropriate system mode after a system reset, making use of relevant system-mode data that was stored by the computer system prior to the system reset to inform a configuration process;
performing a planned mode-change reset of the computer system when it is necessary to change the system mode during normal operation, after storing relevant system-mode data;
monitoring an execution time of at least one of the tasks executed by the computer system;
performing a planned timing reset of the computer system when a monitored task breaches a predetermined worst-case execution time limit for the monitored task, after storing relevant system-mode data;
performing a planned timing reset of the computer system when the monitored task breaches a predetermined best-case execution time limit for the monitored task, after storing relevant system-mode data; and
performing a planned error reset of the computer system when an error is detected that is not related to the monitored task breaching one of the predetermined worst-case execution time limit and the predetermined best-case execution time limit, after storing relevant system-mode data.

22. The method according to claim 21 wherein the step of configuring the computer system comprises the steps of:
determining whether a cause of the system reset was a first-time planned mode-change reset, a repeated planned mode-change reset, a first-time planned timing reset, a repeated planned timing reset, a planned error reset or was some other reset event;
configuring the computer system in a predetermined system mode, if the cause of the system reset was some other reset event;
configuring the computer system in a required system mode, if the cause of the system reset was the first-time planned mode-change reset;
configuring the computer system in an appropriate system mode, if the cause of the system reset was the first-time planned timing reset, by making use of the relevant system-mode data that was stored by the computer system prior to the system reset, with a backup task employed in place of the monitored task that demonstrated a timing error; and
configuring the computer system in a fail-silent mode, if the cause of the system reset was one of the planned error reset, the repeated planned mode-change reset, and the repeated planned timing reset.

23. The method according to claim 21 wherein the method for monitoring the execution time of at least one of the tasks executed by the computer system comprises use of a free-running hardware timer.

24. A computer program product comprising a non-transitory computer-readable medium having machine-readable instructions to cause one or more processors to provide the computer system according to claim 1.

25. A computer program product comprising a non-transitory computer-readable medium having machine-readable instructions to cause one or more processors to provide the method according to claim 21.

* * * * *